United States Patent [19]
Manabe et al.

[11] Patent Number: 5,480,508
[45] Date of Patent: Jan. 2, 1996

[54] APPARATUS FOR MANUFACTURING LAMINATED PREPREG MEMBERS

[75] Inventors: Takao Manabe; Yuhei Yamakawa; Shoichi Shin; Hideyuki Yamada, all of Shizuoka; Mitsuo Nagashima, Atami; Mitsunori Kokubo, Mishima; Masafumi Tsunada; Yasuhiko Nagakura, both of Numazu; Yukio Nakajima, Utsunomiya; Tomohiro Inoue; Kiyoshi Kondo, both of Mibu, all of Japan

[73] Assignees: Toshiba Kikai Kabushiki Kaisha; Fuji Jukogyo Kabushiki Kaisha, both of Tokyo, Japan

[21] Appl. No.: 291,090

[22] Filed: Aug. 18, 1994

Related U.S. Application Data

[62] Division of Ser. No. 130,675, Oct. 4, 1993, Pat. No. 5,397,415, which is a continuation of Ser. No. 756,235, Sep. 10, 1991, abandoned.

[30] Foreign Application Priority Data

Sep. 13, 1990 [JP] Japan .................................... 2-243257
Sep. 13, 1990 [JP] Japan .............................. 2-243258 U
Sep. 25, 1990 [JP] Japan .................................... 2-100075

[51] Int. Cl.⁶ .................................................... B32B 31/18
[52] U.S. Cl. ......................... 156/353; 156/361; 156/433; 156/516; 156/517; 156/523; 156/574; 156/584
[58] Field of Search ...................................... 156/523, 574, 156/264, 265, 256, 353, 230, 235, 234, 238, 252, 267, 516, 517, 344, 247, 248, 285, 584, 361, 353, 441, 433

[56] References Cited

U.S. PATENT DOCUMENTS

| | | |
|---|---|---|
| 3,574,040 | 4/1971 | Chitwood et al. . |
| 4,133,711 | 1/1979 | August . |
| 4,285,752 | 8/1981 | Higgins . |
| 4,351,688 | 9/1982 | Weiss et al. . |
| 4,491,493 | 1/1985 | Eaton . |
| 4,541,886 | 9/1985 | Marlow et al. . |
| 4,900,374 | 2/1990 | Chapman . |
| 4,978,417 | 12/1990 | Grimshaw et al. . |
| 5,064,130 | 11/1991 | Blaimschein et al. . |
| 5,066,352 | 11/1991 | Albers et al. . |
| 5,114,519 | 5/1992 | Grimshaw et al. .................. 156/270 X |

OTHER PUBLICATIONS

Klein, Albert J., "Automated Tape Laying," *Advanced Composites,* Jan./Feb. 1989, pp. 44–52.
Ernest, W. et al, *Plastics Engineering,* "R U Reinforcing Plastics With Robots?", May 1981, pp. 37–46.
Cincinnati Milicron sales brochure entitled "Into The Future . . . With Better Ways to Automate Manufacture of Composite Parts," Pub. No. SP–152–3, 1988.
Ewald, G., "Two Stage Tape Placement Machine," 40th Annual Conference, Reinforced Plastics/Composites Inst. The Society of the Plastics Industry, Jan. 28–Feb. 1, 1985.

*Primary Examiner*—Jeff H. Aftergut
*Attorney, Agent, or Firm*—Beveridge, DeGrandi, Weilacher & Young

[57] ABSTRACT

A prepreg tape is firstly prepared by bonding prepreg layer to a backing paper and then the prepreg tape is cut to a depth enough to cut the prepreg tape but not the backing paper. A unnecessary portion of the prepreg tape is removed from the backing paper to obtain a cut prepreg tape. A laminating attachment is moved in a predetermined direction while urging the prepreg tape against the surface of an operating table. The cut prepreg tape is peeled off from the backing paper and the peeled off prepreg tape is bonded to the operating table. The cut prepreg tapes are successively oriented in a predetermined direction and juxtaposed to form a laminated sheet. When the sheet is mounted on a mold of a predetermined shape. When the impregnated thermosetting resin is perfectly cured under heat and pressure a product useful for assembling various vehicles can be obtained.

17 Claims, 16 Drawing Sheets

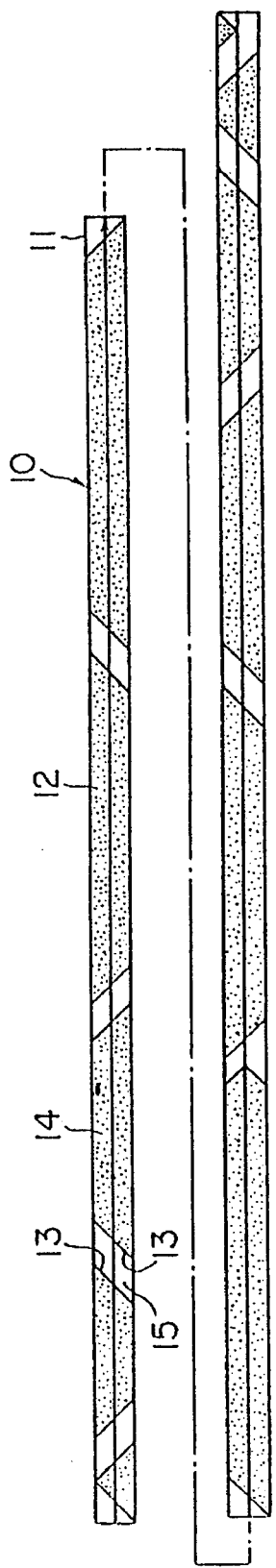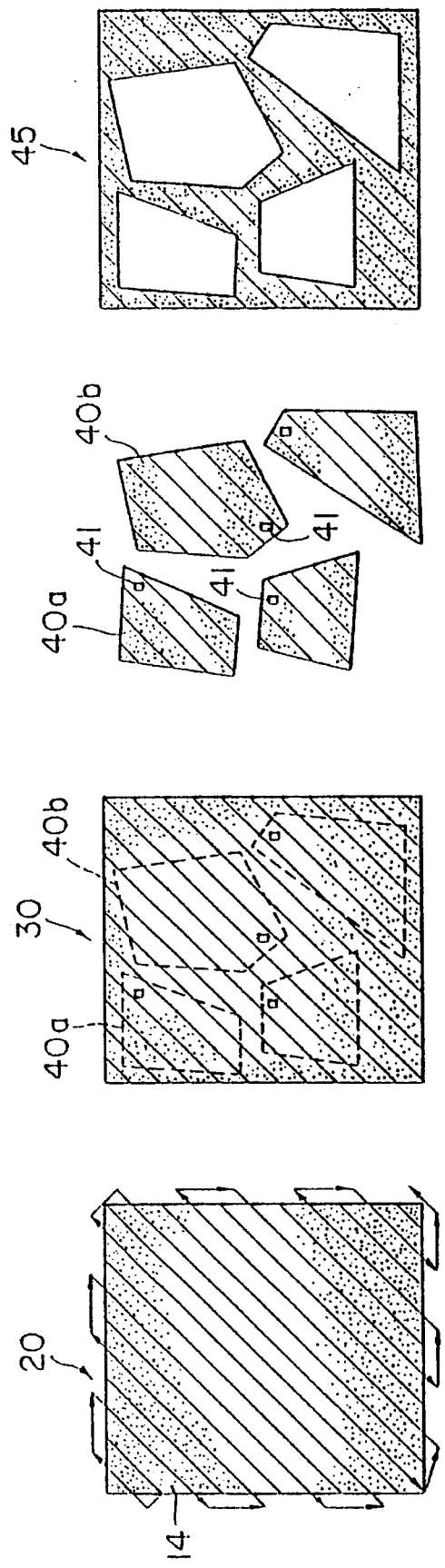
FIG. 1 (A)
FIG. 1 (B)
FIG. 1 (C)
FIG. 1 (D)
FIG. 1 (E)

APPARATUS FOR MANUFACTURING LAMINATED PREPREG MEMBERS

This is a divisional of application Ser. No. 08/130,675 filed on Oct. 4, 1993, now U.S. Pat. No. 5,397,415, which is a continuation of application Ser. No. 07/756,235 filed Sep. 10, 1991 now abandoned.

BACKGROUND OF THE INVENTION

This invention relates to a method and apparatus for manufacturing a laminated prepreg member or article by laminating prepreg layers prepared by impregnating setting or thermoplastic resin into reinforced fibers, and more particularly, a method and apparatus for efficiently and automatically manufacturing a laminated prepreg member by using the same operating table.

A prepreg is a type of moldable material used for making reinforced plastics and is prepared by uniformly impregnating a thermosetting resin prepared by admixing a curing agent, a coloring agent, and a filler at a suitable ratio into such reinforcing member as a glass mat or a glass cloth. After impregnating, the prepreg is dried to semi-set or cured state so that the resulting prepreg member is pliable. When using the prepreg member to form parts of motor cars, aeroplanes, motor boats, etc. the prepreg member is coated on a mold of the part coated with a mold release agent. After the prepreg member has been perfectly set or cured under pressure and heat, the completed product is hard and light and has a strength larger than that of steel sheet. For this reason, in recent years prepreg products are abundantly used in various vehicles.

Heretobefore, sport or leisure merchandise, and structural parts of various machines have been made of such composite materials as carbon fibers reinforced with plastic (CFRP) or the like. Such composite materials have been prepared by impregnating thermosetting or thermoplastic resin into carbon fibers, aramid fibers, boron fibers, glass fibers or other reinforcing fibers to prepare a prepreg layer. Then the prepreg layers are laminated at different angles to obtain a laminated prepreg sheet. The laminated prepreg sheet is cut to have a shape suitable for parts to be prepared. A cut piece of a laminated prepreg sheet is mounted on a shaping jig and then applied with heat and pressure to be molded into an article having a desired configuration and strength.

In the past, a laminated prepreg member has been prepared by forming a laminated prepreg sheet by using a prepreg laminating apparatus and then conveying the sheet to a trimming machine for cutting the sheet to have a desired configuration. For efficiently laminating the prepreg sheets, a flexible tape (hereinafter called as a backing paper) having one surface impregnated with a silicone is prepared and then the prepreg sheet is bonded to the other surface to obtain a prepreg tape. In the prepreg laminating apparatus, the prepreg layer is peeled off from the prepreg tape and the layer is continuously oriented in a predetermined direction, and then laminated while applying a pressure to obtain a prepreg sheet. Furthermore, for identifying individual laminated prepreg members, a marking device is used for applying an identification mark onto a portion of each laminated prepreg member.

In the foregoing method and apparatus for preparing laminated prepreg member, respective manufacturing steps have been carried out discontinuously at different places. Moreover, it has been necessary to convey laminated prepreg sheets to different places at which respective steps are carried out. For this reason, there are the following problems:

(a) when a thermosetting type prepreg tape and a laminated prepreg member are maintained at a room temperature, the chemical reaction proceeds to harden the material. For this reason, where it is necessary to temporarily interrupt the molding operation at an intermediate point of adjacent steps, it is necessary to temporarily store the laminated prepreg member in a refrigerating cabinet maintained at a temperature of below about −18° C. This necessitates a useless operation and much operating time.

(b) Since not cured prepreg and laminated prepreg member are soft and flexible their handling and conveyance are difficult. For this reason, it is necessary to use a special jig for conveying the laminated prepreg member. Thus, the conveying operation is not only troublesome but also requires a long operating time.

(c) Since treating times at various steps are different, even when the steps are automated, it is impossible to realize a line balance between respective steps, thereby decreasing the actual operating time of the apparatus as a whole.

(d) Where machining operation or manual operation is necessary at respective steps, it is necessary to prepare a manufacturing program for each step and to prepare a working program. Thus, the supervision of manufacturing becomes troublesome and not efficient.

(e) Where the laminating operation of the prepreg piece and the cutting operation of the laminated prepreg sheet are made on different operating tables, at least two operating tables are necessary, thus increasing the installation space of the manufacturing apparatus.

(f) Where a prepreg sheet is formed by peeling off a desired portion from a prepreg tape, the sheet has been formed while the prepreg tape is being cut. Accordingly, it has been impossible to laminate the prepreg tape during the cutting thereof, whereby a long time is necessary for laminating the prepreg sheets.

SUMMARY OF THE INVENTION

Accordingly, it is an object of this invention to provide a novel method and apparatus for manufacturing a laminated prepreg member capable of automatically and efficiently manufacturing a laminated prepreg member.

Another object of this invention is to provide a novel laminated prepreg member manufacturing machine capable of automatically and efficiently manufacturing laminated prepreg members having various configurations.

A further object of this machine is to provide a novel laminated prepreg manufacturing machine for simplifying the manufacturing system and reducing the installation space.

A still further object of this invention is to provide a novel laminated prepreg manufacturing machine for removing unnecessary portions from a prepreg tape according to a predetermined program.

Another object of this invention is to provide a novel prepreg segment assembling apparatus of a simple configuration and for reducing an installation space and improving control ability so as to accurately and efficiently assemble the prepreg segments.

According to one aspect of this invention there is provided a method of manufacturing a laminated prepreg member comprising the steps of preparing a prepreg tape made up of a prepreg layer bonded to a backing paper; cutting the prepreg tape to have a predetermined configuration to a depth enough to cut the prepreg tape but not cut the backing paper; removing unnecessary portion of the prepreg tape from the backing paper to obtain a cut prepreg tape; moving a laminating attachment in a predetermined direction while urging the cut prepreg tape from which the unnecessary prepreg portion has been removed against the surface of an operating table; peeling off the cut prepreg tape from the backing paper; bonding the peeled off prepreg tape to the surface of the operating table, successively; orienting, in a predetermined direction, the cut prepreg tapes to form a prepreg sheet; urging the cut prepreg tape while it is being moved in a predetermined direction against the prepreg sheet; continuously laminating the cut prepreg tapes and orienting the cut prepreg tapes in a predetermined direction to obtain a laminated sheet including a plurality of prepreg layers; trimming the laminated prepreg sheet on the operating table; separating and taking out the trimmed and laminated member from the laminated prepreg sheet.

According to another aspect of this invention, there is provided an apparatus for manufacturing a laminated prepreg member comprising prepreg cutting means including a prepreg tape cutting device for only a prepreg layer of a prepreg tape; means for removing an unnecessary portion from the prepreg tape; an operating table on which a laminated prepreg sheet is formed, a removable head for moving above the operating table in parallel with the surface of the operating table; a lamination attachment mounted on the removable head; laminated prepreg tape take out means located on the downstream side of the operating table; a plurality of the lamination attachments and trimming attachments being prepared and selected ones of the lamination attachments and the trimming attachments being mounted on the removable head.

According to a further aspect of this invention there is provided apparatus for manufacturing a prepreg sheet comprising an operating table, linear ways installed on one side of the operating table in parallel therewith; a column base movable along the linear ways; a pinion and a rack meshing with the pinion, the pinion and the rack cooperating to move the column base in parallel with the operating table; an arm supported by the column base to extend across the operating table, a feed screw contained in the arm and rotated by a driving nut; a saddle supported by the outer end of the arm to be movable in the vertical direction; a laminated head supported by a rotatable shaft; the laminating head including a pay out reel for paying out a laminated prepreg tape, a backing paper take up reel and a bonding roller.

BRIEF DESCRIPTION OF THE DRAWINGS

In the accompanying drawings:

FIG. 1 is a sectional view useful to explain the manufacturing steps of a laminated prepreg member according to this invention;

DESCRIPTION OF THE PREFERRED EMBODIMENTS

Figure 2:
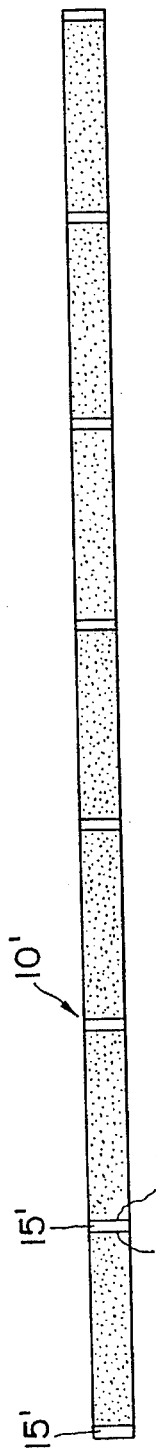
FIG. 2 is a plan view showing one example of a cut prepreg tape utilized in this invention.

A method of manufacturing the laminated prepreg member of this invention is shown in steps (i)–(iv) of FIG. 1.

At first, a layer of prepreg 12 is bonded to a flexible tape shaped backing paper 11 to prepare a prepreg tape 10. By using a suitable cutting means, for example a ultrasonic cutter, grooves 13 are cut through the prepreg tape 12 to which the backing paper 11 has been bonded. The depth of the groove 13 is such that it perfectly cuts the prepreg 12 but does not cut the backing paper 11. The grooves 13 forms a plurality of prepreg segments 14. The position and orientation of the grooves 13 are determined by the orientation of the prepreg segments 14 and the size of the prepreg sheet which are utilized in the succeeding prepreg molding step. Where a square prepreg sheet 20 is to be formed by continuously arranging a plurality of prepreg segments 14 at an angle of 45° as shown in FIG. 1(ii). In this case, the positions of grooves 13 are determined such that a plurality of prepreg segments 14 can be formed, each having a desired configuration and dimension which are necessary for forming a desired prepreg sheet 20. Then for removing portions not necessary to form the prepreg sheet 20, a prepreg removing device is used which removes unwanted prepreg portion between adjacent prepreg segments 14 but leaving the backing paper 11 as it is. The portions from which unnecessary portions have been removed are designated by a reference numeral 15. In this manner, a cut prepreg tape 10 as shown in FIG. 1(i) can be obtained comprising only one prepreg segment 14 to be used in the next step is bonded to the backing paper 11 from which unnecessary portions have been removed.

This prepreg tape 10 is wound about a tape winding member by using backing paper 11. The cut prepreg tape 12 thus wound is conveyed onto a flat operating table and then continuously moved in a predetermined direction (45° in this embodiment) while urging the prepreg segment 14 against the surface of the operating table. Then the prepreg tape 10 is continuously payed out, and the prepreg segment 14 is peeled off from the backing paper 11 by the adhesive force to the surface of the operating table to be continuously oriented in a predetermined direction (that is 45°). In the directions of arrows shown in FIG. 1(ii) the cut prepreg tapes 10 are continuously moved at an angle of 45° while mating together the side edges of the cut prepreg tapes 12, whereby a prepreg sheet 20 of a predetermined shape (square in this embodiment) is obtained.

As above described, the first layer of the prepreg sheet 20 is formed, and a second layer of the prepreg sheet is laminated on the first sheet 20. In the same manner as above described, the second layer of prepreg sheet is formed by preparing a cut prepreg tape 10 from which unnecessary portions have been removed, moving the cut prepreg tape in a predetermined direction (for example, by rotating by 90° the orientation angle of the tape with respect to the angle of the first layer tape) and continuously orienting a prepreg segment 14 having a predetermined configuration. By repeating these operations, a laminated prepreg sheet 30 can be formed which comprises a lamination of a predetermined number of layers of prepreg sheets.

Where prepreg sheets are laminated on a mold release sheet placed on the surface of the operating table, the surface of the operating table can be protected. Furthermore, removal of a product from the operating table is facilitated.

The laminated prepreg sheet 30 formed on the operating table is cut with a cutter to a depth such that the laminated prepreg sheets are perfectly cut but the mold release sheet would not be cut. Then the partially cut laminated prepreg sheet is trimmed into laminated prepreg pieces 40a and 40b (see FIG. 1(iii)). Then respective laminated prepreg pieces 40a and 40b are taken out by using a conveyor (see FIG. 1(iv)). Respective laminated prepreg pieces 40a and 40b are applied with identification marks 41 with a marking device. It is advantageous to apply these identification marks before the pieces are taken out as products.

After taking out the laminated prepreg pieces 40a and 40b, the remaining portion 45 of the laminated prepreg sheet is taken away from the upper surface of the operating table. The surface of the operating table is used for preparing the next new laminated prepreg member.

In the foregoing description, a method of forming a square shaped laminated prepreg sheet 30 has been described by sequentially arranging prepreg segments 14 in a direction of 45°, but where a square laminated prepreg sheet is to be manufactured a prepreg tape 10' formed with slots extending in a direction perpendicular to the longitudinal direction of the tape as shown in FIG. 2 is prepared. In this case too, portions 15' to be removed later are formed between slots 13' by anticipating a permissible error for the laminated prepreg layers.

Figure 3:
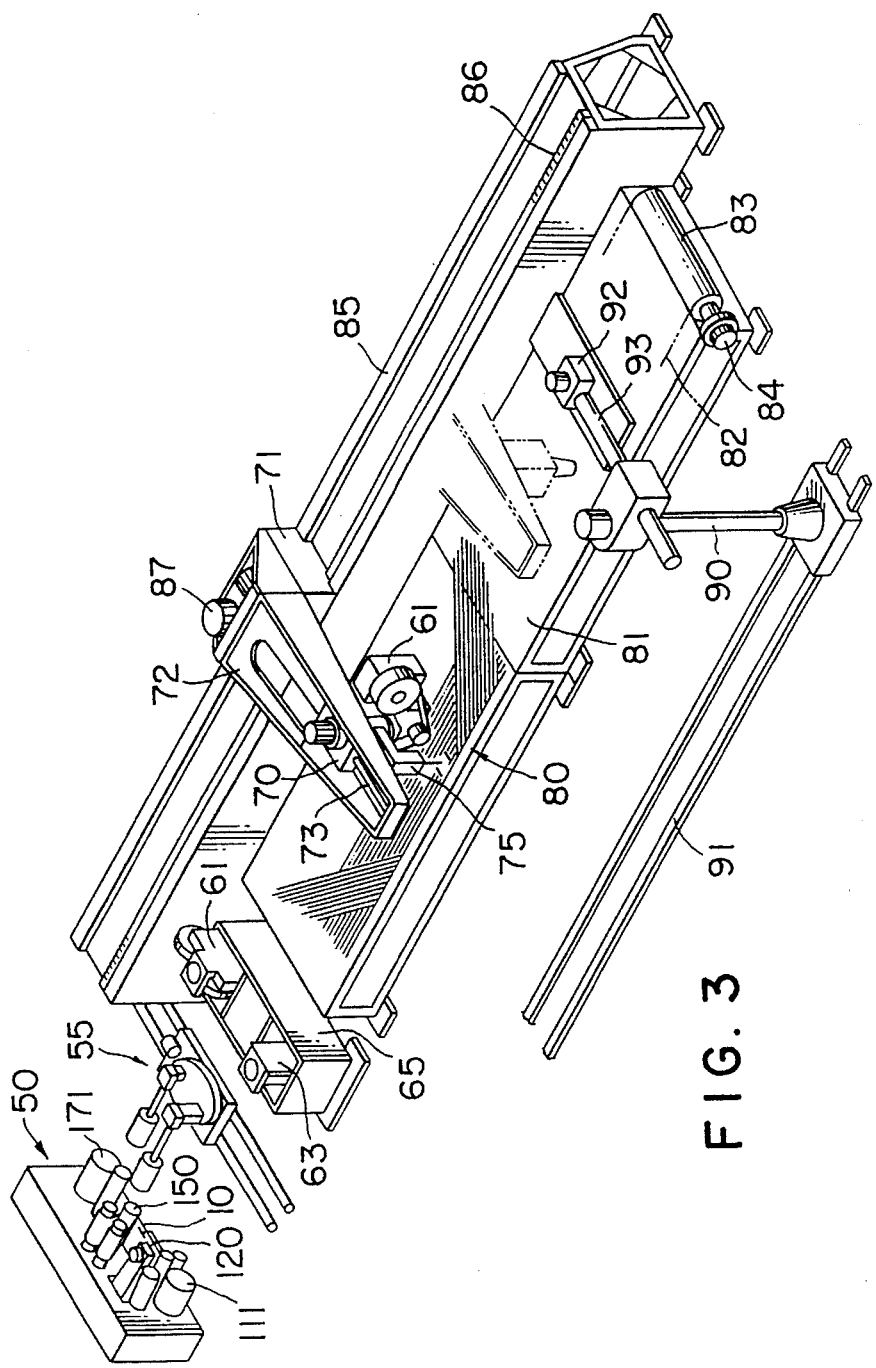
FIG. 3 is a perspective view showing certain main parts of a manufacturing apparatus embodying the invention.
Figure 4:
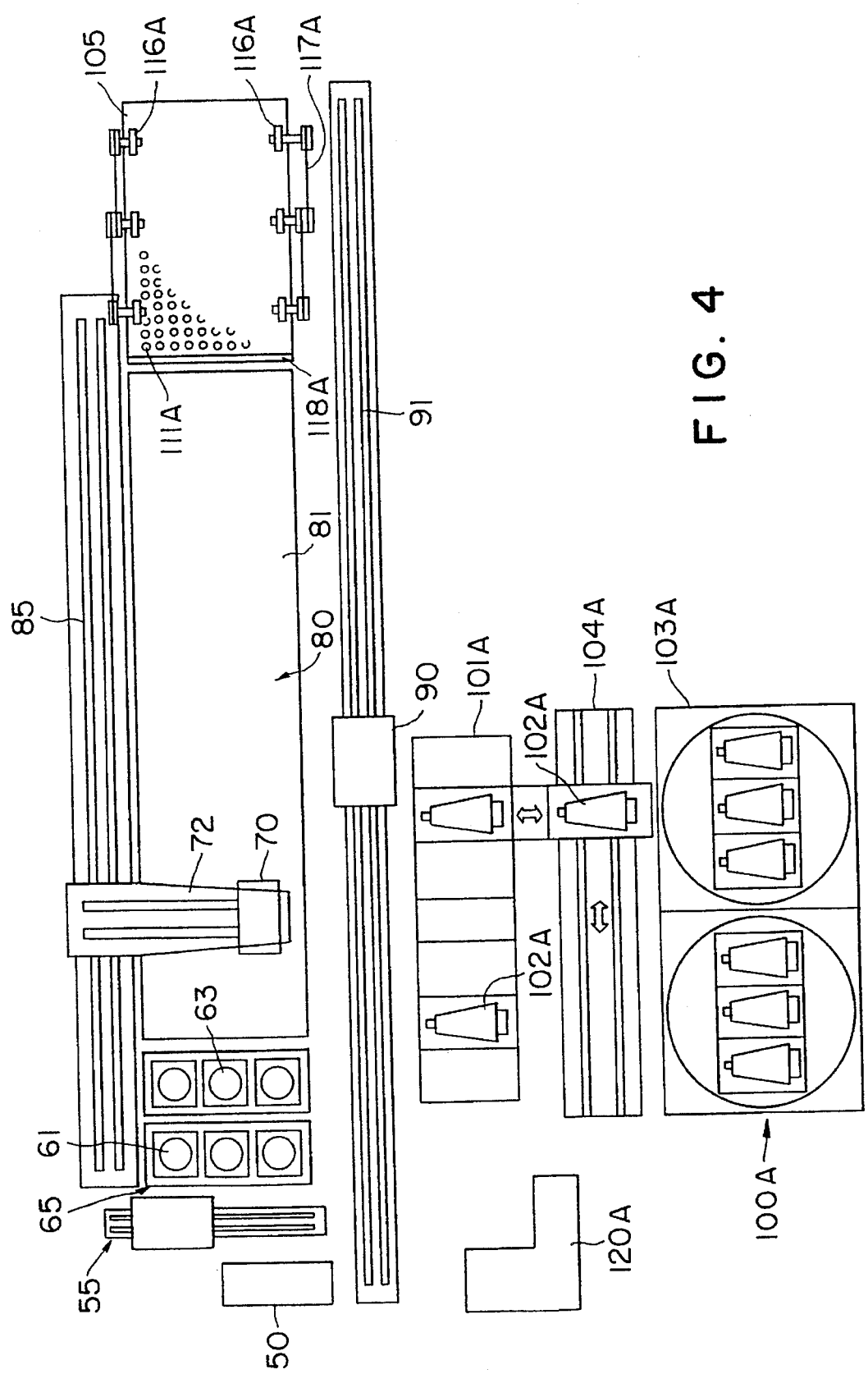
FIG. 4 is a schematic plan view showing one embodiment of the prepreg member manufacturing apparatus according to this invention.

FIGS. 3 and 4 show one example of apparatus for manufacturing a laminated prepreg member described above.

This apparatus comprises a prepreg cutting apparatus 50 having a prepreg cutting device 120 for cutting a prepreg tape 12 of a prepreg sheet to have a desired configuration, and a removing device 150 for removing unnecessary prepreg portion from a prepreg tape 12. As the prepreg cutting means can be used a ultrasonic wave cutter, for example. A control device contained in the prepreg cutting apparatus 50 controls the position of cutting and the depth of cutting. The cutting position is determined in accordance with the configuration of the resulting prepreg sheet and the direction of orientation of the prepreg piece. The prepreg cut depth is determined such that the cutter cuts only the prepreg but not the backing paper 11.

The cutting operation of the prepreg is effected by paying out the prepreg tape 12 from a pay out roller 111 and then cutting the prepreg tape to a predetermined depth with cutting device 120. Then, the prepreg tape 12 is sent to a undesired portion removing means 150 at which portions of the prepreg tape not necessary to form a prepreg sheet are removed. The removable of the unnecessary portions can be done by urging an adhesive tape against the unnecessary portions for removing them by an adhesive portion or by using a pin which pierces and removes the unnecessary portions.

A prepreg tape (cut prepreg tape) from which unnecessary portions have been removed is taken up (or wound about) a take up roller 171. When the prepreg tape of one roll has been cut by the cutting apparatus 50, a roll of a new prepreg tape is mounted on the pay out roll 111.

The detail of the cutting device will now be described with reference to FIGS. 14–19.

Figure 14:
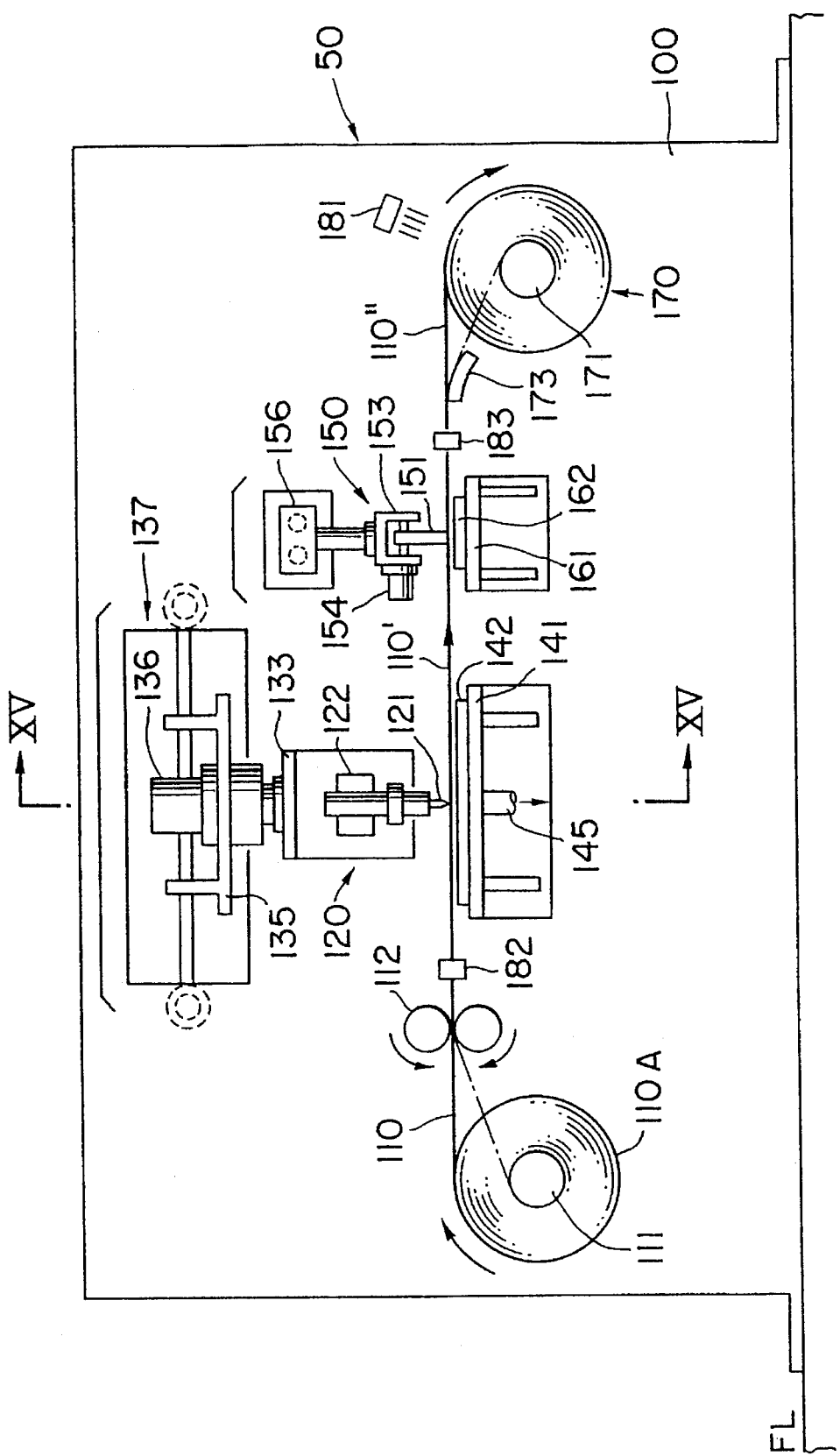
FIG. 14 is a front view showing a modified prepreg cutting apparatus.
Figure 15:
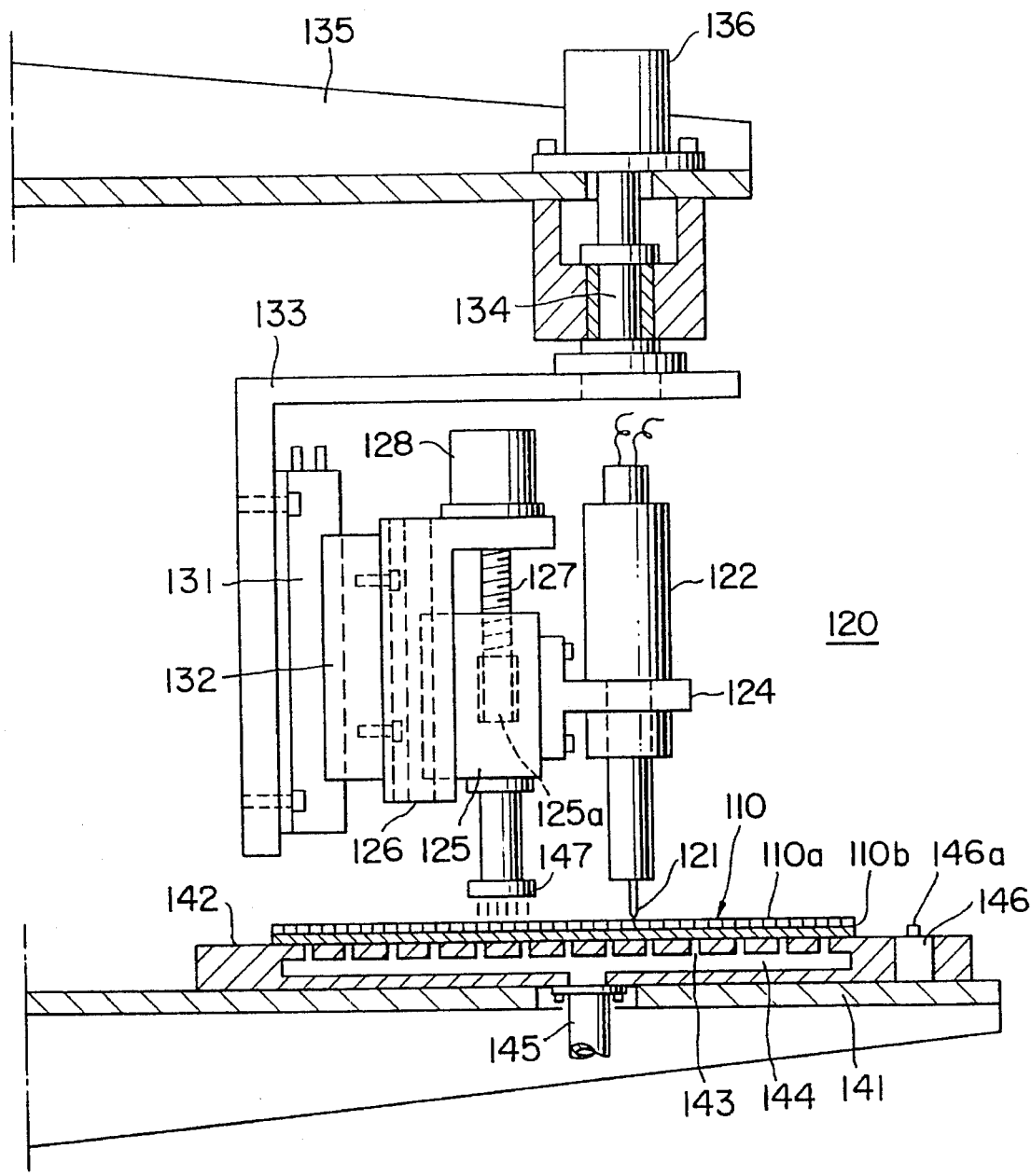
FIG. 15 is a front view partly in section showing the detail of the prepreg cutting device shown in FIG. 14 taken along a line XV—XV in FIG. 14.

As shown in FIG. 14, on one side of a frame 100 is mounted a pay out roller 111 adapted to pay out a prepreg tape 110 which is advanced by a pair of feed rollers 112. These feed rollers are intermittently rotated by a servomotor, not shown.

On the downstream side of the feed rollers 112 is installed a prepreg cutting device 120. As shown in detail in FIG. 15, the cutting device 120 comprises a cutting blade 121 which is removably mounted on a ultrasonic oscillator holder 122 which generates ultrasonic oscillation applied to cutting blade 101. Electric power for operating the ultrasonic oscillator is supplied through lead wires, not shown. The ultrasonic oscillator holder 122 is secured to a movable block 125 through a bracket 124. One side surface of the movable block is slidably mounted on a guide member 126 formed with a vertical guide way. The movable block 125 is provided with a vertical threaded opening 125a for receiving a threaded rod 127 driven by a small servomotor or a stepping motor 128.

The guide member 126 is secured to a slidable member 132 of a vertically movable member 131 so that the guide member 126 is moved in the vertical direction together with the slidable member 132. An air cylinder or a pressure oil cylinder can be used for moving the vertically movable member 131 which is secured to the vertical leg of a L shaped bracket 133.

A vertical shaft 134 is secured to the horizontal leg of bracket 133. The vertical shaft 134 is driven by a servomotor 136 mounted on a horizontal arm 135. This horizontal arm is reciprocated in the horizontal direction along frame 100 and in a direction orthogonal to frame 100.

A horizontal table 141 is disposed beneath cutting blade 121. One end of horizontal table 141 is secured to frame 100 and an anvil 142 is mounted on the horizontal table 141. A plurality of air openings 143 are provided through the upper portion of anvil 142. The air openings 143 are communicated with a horizontal air passage 144 formed in the anvil. The air passage 144 is communicated with air suction means, not shown, through a pipe 145.

A measuring device 146 for measuring the degree of projection of cutter blade 121 is embedded at the righthand end of anvil 142. The measuring device 146 has a vertically movable projection 146a adapted to engage the lower end of cutter blade 121. A detector 147 is secured to the lower end of the movable block 125 for measuring the flatness of the upper surface of anvil 142.

Figure 16:
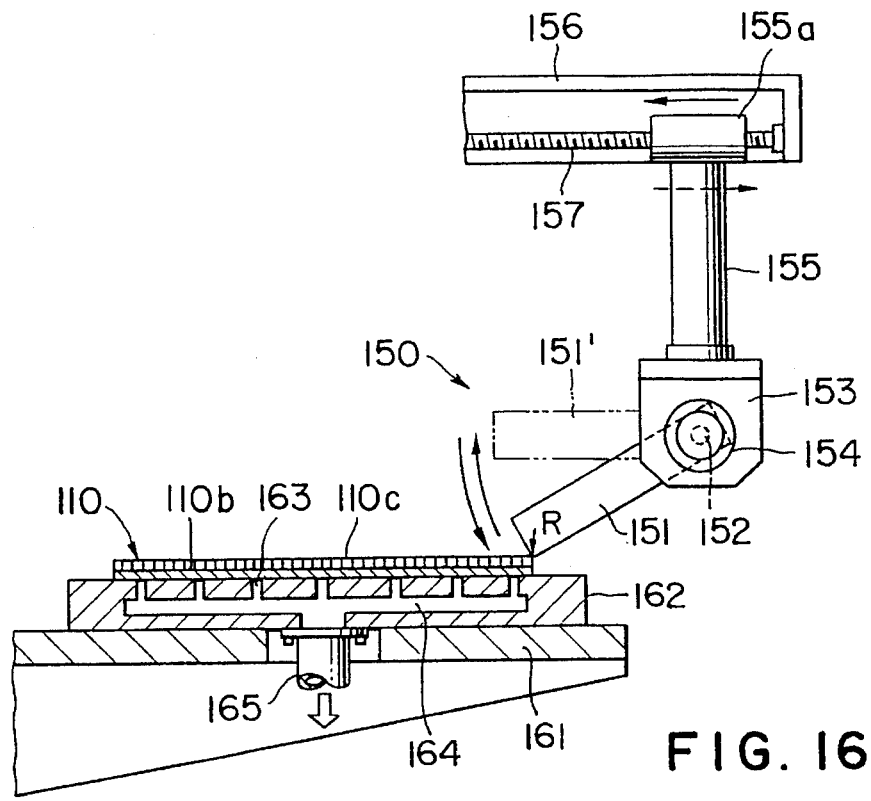
FIG. 16 is a side view showing a device for removing an unnecessary portion of the prepreg tape.
Figure 17:
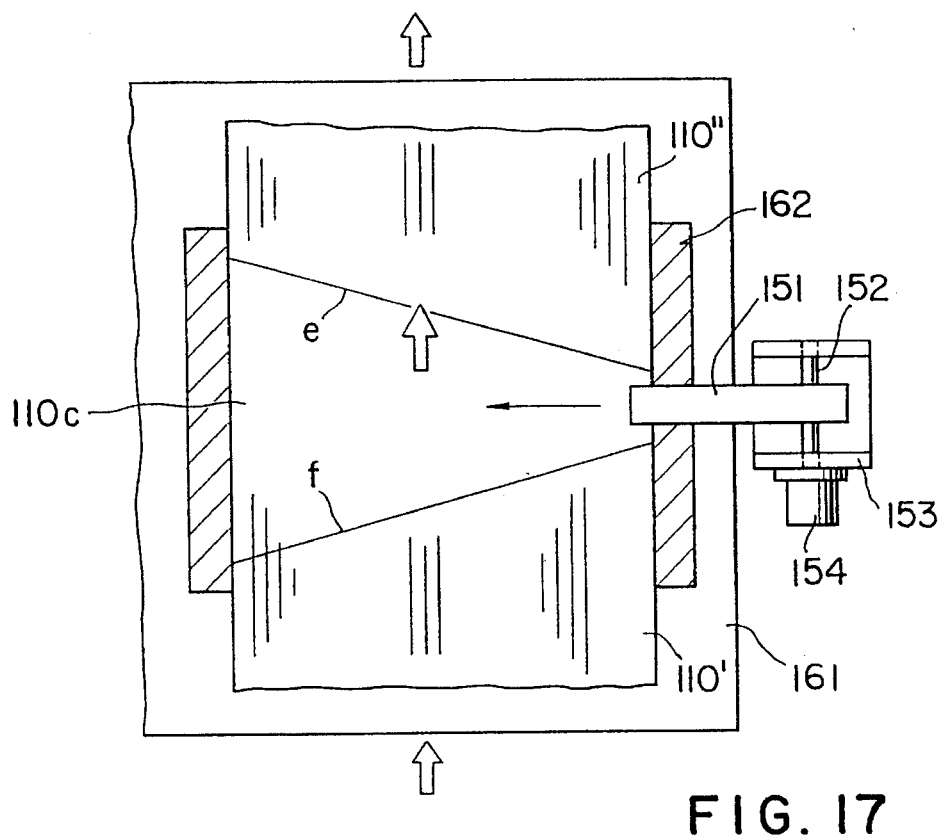
FIG. 17 is a plan view showing the removing device shown in FIG. 16.

On the downstream side of the prepreg cutting device 120 is provided a unnecessary prepreg portion removing device 150 shown in FIG. 16 is installed for the purpose of removing unnecessary prepreg portion from a prepreg tape 110' cut to have a predetermined configuration. The unnecessary prepreg removing device 150 is provided with a removing arm 151 for separating unnecessary prepreg portion away from the backing paper by a swinging motion, as shown in FIGS. 16 and 17. One end of the arm 151 is secured to a rotary shaft 152 rotatably supported in a holder 153. The arm 151 is swung between a solid line position and a dot and dash line position as shown in FIG. 16. A swinging motor 154 is mounted at the lower end of holder 153 for rotating shaft 152.

At the free end of arm 151 at which it engages the prepreg is formed an arc having a radius of curvature of about 5 mm.

The holder 153 is supported by a vertical supporting member 155, the upper end 155a thereof being moved in the horizontal direction by a threaded rod 157 rotatably supported by a horizontal guide arm 156. As the threaded rod 157 can be used a ball screw driven by a servomotor or an oil pressure cylinder, not shown.

A horizontal table 161 is disposed beneath the unnecessary prepreg portion removing arm 151. One end of table 161 is secured to frame 100, and the anvil 162 is mounted on horizontal table 161. A plurality of air ports 163 are provided through the upper wall of anvil 162, the air ports 163 being communicated with an air passage 164 which in turn is communicated with air suction means, not shown, through a pipe 165.

A cut prepreg tape take up device 170 is installed on the downstream side of the unnecessary prepreg portion removing device 150 for taking up cut prepreg tape 110" (see FIG. 17) from which a unnecessary portion of the prepreg has been removed from the backing paper. As shown in FIG. 14, the cut prepreg tape take up device 170 has a reel 171 taking up the cut prepreg tape 110". The take up reel 171 is driven by a driving mechanism, not shown, contained in the main frame 100.

Between the unnecessary prepreg portion removing device 150 and the take up device 170 is arranged a chute 173 for preventing a lateral movement of the cut prepreg tape 110".

Various detectors are disposed along the passage of the prepreg tape. For example, a ultrasonic oscillation sensor 181 is installed near take up device 170 for measuring the diameter of the cut prepreg tape 110" wound about the take up reel 171. The output of the oscillation sensor 181 is fed back to a control device of a torque motor, not shown, for driving take up device 171 for maintaining at a constant value the take up tension of the cut prepreg tape 110". Edge detectors 182 and 183 are disposed near the pay out reel 111 and take up reel 171 respectively.

The embodiment shown in FIGS. 14-19 operates as follows.

Firstly, a roll 110A of the prepreg tape 110 is mounted on pay out reel 111 and the leading end of the prepreg tape 110 is clamped between a pair of feed rollers 112. Feed rollers 112 are intermittently rotated for moving the prepreg tape 110 toward right by a predetermined length. At this time, for the purpose of applying a desired tension to the prepreg tape, a torque opposite to the normal pay out torque is applied to a torque motor, not shown, for driving the pay out reel 111.

The prepreg tape 110 is moved to the prepreg tape cutting device 120. Then the backing paper 110b (see FIG. 15) of the prepreg tape 110 is sucked against the upper surface of anvil 142 by the attractive force of air in the air passage 144.

Then the prepreg tape 110 is cut by cutting blade 121. To this end, horizontal arm 135 and bracket 133 are moved for bringing cutting blade 121 to a desired horizontal position. At the same time, vertically movable device 121 is operated for vertically moving slidable piece 132 together with guide member 126, movable block 125 and ultrasonic wave oscillator holder 122 for effecting approximate positioning of the vertical cutter blade 121. Thereafter, the flatness detector 147 is operated to detect the flatness of the upper surface of anvil 142. The output of the flatness detector 147 is fed back to the control device, not shown, of servomotor 128 for a predetermined amount to rotate threaded rod 127 so as to move a little movable block 125 and cutter blade 121. Due to this small movement, the cutter blade 121 is lowered to a position corresponding to the thickness of prepreg sheet 110a.

After adjusting the vertical position of cutter blade 121, horizontal arm 135 and bracket 133 are moved in accordance with a preprepared program for moving cutter blade 121 along a predetermined locus, thereby cutting prepreg sheet 110a. At this time, ultrasonic oscillation is imparted to cutter blade 121 from ultrasonic oscillator holder 122. Although the cutting of prepreg sheet 110a is possible even when such ultrasonic vibration is not applied, the application of the ultrasonic vibration ensures smooth cutting as well as longer operating life of the cutter blade 121.

Not only during the cutting operation but also at the time of exchanging, the cutter blade 121 is periodically urged against projection 146a of the measuring device 146 for detecting change of the mounting position of cutter blade 121 and the wear quantity occurring during the cutting operation. These detected values are fed back to the control device of servomotor 128. Thus, a fine control is effected such that the cutter blade 121 would be positioned at a suitable position not to cut the backing paper 110b.

When prepreg 110a is cut by prepreg cutting device 120 and after a predetermined number slits are formed, the prepreg tape 110' is transferred to unnecessary prepreg portion removing device 150 shown in FIG. 16 for removing unnecessary portions.

As shown in FIG. 16, after transferred onto horizontal table 161, the backing paper 110b is sucked against the upper surface of anvil 162 by suction through air ports 163. Then swinging motor 154 is actuated to swing arm 151 so that its free end engages one end of unnecessary prepreg portion 110c between slits formed by cutting blade 121. Under these conditions, threaded rod 157 is rotated to move supporting member 155 in a direction parallel to prepreg tape 110'. Unnecessary prepreg portion 110c is peeled off from backing paper 110b by the swinging motion of swinging arm 151. The peeled off portion drops from an end opposite to the peel off start position of the prepreg tape 110'.

A cut prepreg tape 110" obtained by removing unnecessary portion of the prepreg 110c from backing paper 110b is wound into a roll by cut prepreg tape take up device 170. The roll thus formed is mounted on a prepreg laminating machine, not shown, for laminating prepreg layers.

As above described prepreg tape 110 is continuously moved from pay out reel 111 to take up reel 171 through prepreg cutting device 120 and unnecessary prepreg removing device 150 where the running position of prepreg tape 110 deviates in the transverse direction of the tape 110, the positions of the edges of the tape 110 are detected by edge detectors 182 and 183 shown in FIG. 14. In response to the outputs of edge detectors 182 and 183, the pay off reel 111 and take up reel 171 are displaced in a direction perpendicular to the running direction of the prepreg tape so as to align the edges of prepreg tape, thereby obtaining a neatly wound coil of the prepreg tape.

According to the embodiment shown in FIGS. 14–19 it is possible to automatically cut the necessary portion of the prepreg tape to have a predetermined configuration and to remove unnecessary portions of the prepreg tape.

Figure 18:
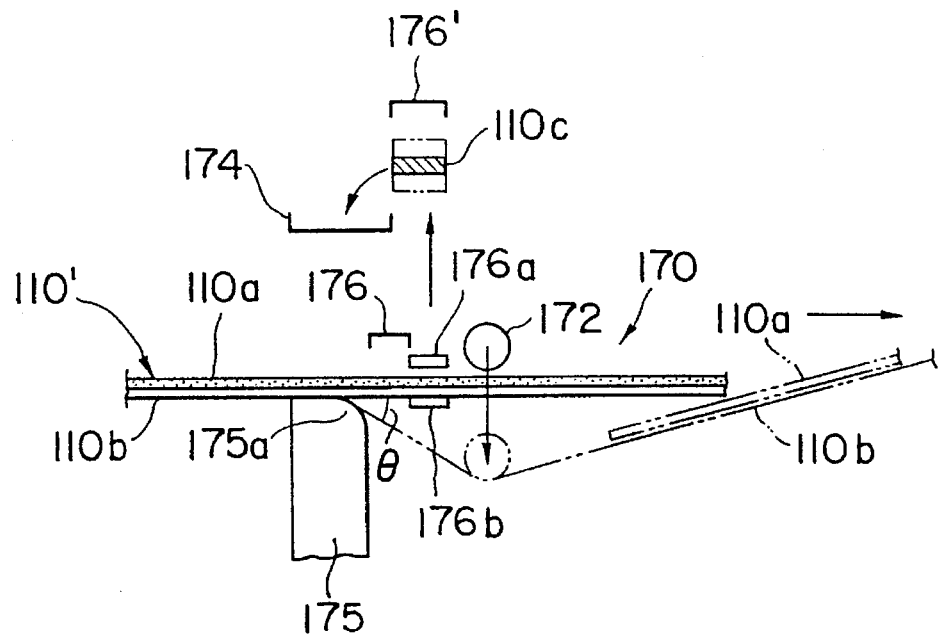
FIGS. 18 and 19 are partial side views showing other examples of the device for removing an unnecessary portion of the prepreg tape.
Figure 19:
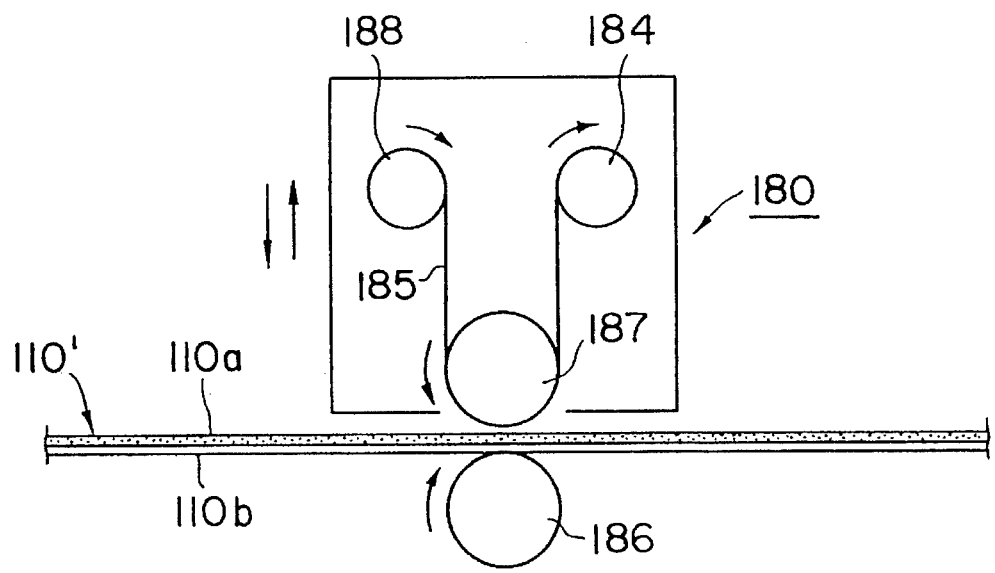

FIGS. 18 and 19 are partial views showing other embodiments of the prepreg cutting device and a removing device for removing unnecessary portions of the prepreg tape.

In the modification shown in FIG. 18 a prepreg tape formed with cut lines is subjected to a bending deformation for peeling off unnecessary prepreg tape portions from the backing paper. More particularly, an edger device 175 is provided on one side of the prepreg tape cutting device. The edger device 175 is constituted by a vertical member disposed perpendicular to the direction of running of the prepreg tape 110'. The upper portion of one side of the edger device 175 is formed with a curved portion 175a having a relatively large radius of curvature. It is advantageous to select the radius of curvature of the bending angle θ with respect to the running surface to be about 5°–10° when the prepreg tape 110' is bent along the curved portion 175a.

On the downstream side of the edger device 175 is arranged a guide roller 172 to be movable in the vertical direction to traverse the running surface of the prepreg tape 110'.

Between the edger device 175 and a guide roller 172 is disposed a chuck device 176 made up of an upper plate 176a and a lower plate 176b with the running prepreg tape 110' interposed therebetween. The chuck device 176 can reciprocate between the running surface of prepreg tape 110' and a bucket 174 adapted to receive unnecessary prepreg portions.

According to the unnecessary portion removing device of the prepreg tape shown in this modified embodiment, a cut prepreg tape 110' is conveyed into the removing device 150 while sliding on the upper surface of the edger device 175. Immediately before reaching the unnecessary prepreg portion 110c which should be removed, to the curved portion 175a of edger device 175, guide roller 172 is lowered from the upper position shown by a solid line to a lower position shown by dot and dash lines. The lowered guide roller 172 bends the prepreg tape 110' along the curved surface 175a of the edger device 175.

By this bending operation, the portion of the prepreg tape 110' formed with slits is separated from the backing paper 110b not formed with slits by the action of curved surface 175a. Unnecessary portions of the prepreg tape 110c are moved in the horizontal direction, whereas the backing paper is moved toward the take up device along the guide roller 172 after being downwardly bent by the guide roller.

The position of the prepreg tape which has been provided with slits is separated from the backing paper 110b not formed with slits by the curved portion 175b. Unnecessary portions of the prepreg 110c are conveyed in the horizontal direction, whereas the backing sheet 110b is moved toward the take up device along the guide roller 172 after being bent by the guide roller.

The leading end of the unnecessary portion 110c moving in the horizontal direction is mounted of lower plate 176b of chuck device 176, the lower plate 176b being positioned at a position a little below the running surface of prepreg tape 110'. Then the upper plate 176a is lowered for clamping the leading end of the unnecessary portion 110c of prepreg is moved to bucket 174 where unnecessary portion 110c is completely separated from the backing paper. Then the upper plate 176a and the lower plate 176b of the chuck device 176 are separated away to release the unnecessary portion whereby unnecessary portion 110c of the prepreg falls down into bucket 174.

Upon completion of the removal of the unnecessary portion 110c, the guide roller 172 is raised to a position above the running surface of the prepreg tape to prepare to receive the next unnecessary portion. According to the removing device 150 of the unnecessary portion of the prepreg it is possible to remove the unnecessary portion while the prepreg tape is being conveyed, thereby shortening the operating time.

In a further modification shown in FIG. 19 the unnecessary portion of the prepreg tape is peeled off from the backing paper by an adhesive force. In this modification, vertically spaced two rollers 186 and 187 are provided to clamp the prepreg tape 110' therebetween. An adhesive tape 185 is wound about the upper roller 180 with its adhesive surface directed outwardly. The adhesive tape 185 is payed out from a pay out reel 188 and taken up by a take up reel 184. A slit braking force is applied to the shaft of the pay out reel 183 while the take up reel 184 is driven by a motor, for example a torque motor. As a consequence the adhesive tape 185 can be conveyed between pay out reel 188 and take up reel 184 and about the upper roller 187 without any slack.

The prepreg tape 110' whose prepreg tape alone has been cut by the prepreg cutting device is conveyed, and when the unnecessary portion of the prepreg tape comes to a position beneath the upper roller 187, this roller is lowered for clamping the prepreg tape 110' between the upper and lower rollers 182 and 181. As a consequence the unnecessary portion adheres to adhesive tape 185. When the upper roller 182 is raised, the unnecessary portion of the prepreg tape adhered to the adhesive tape is taken up by the take up reel together with the adhesive tape 185.

With this modified embodiment unnecessary portions of the prepreg tape can be removed with a relatively simple apparatus.

As the device for removing the unnecessary portion of the prepreg tape may be used a device in which an adhesive block is urged against the prepreg tape to remove the unnecessary portion, and a vacuum adsorbing pad which removes the unnecessary portions.

According to the modified embodiments described above it is possible to remove only the unnecessary portions of the prepreg tape according to a predetermined program.

Turning back to FIG. 3, a prepreg tape exchanging device 55 is provided adjacent to prepreg tape cutting device 50. The prepreg tape exchanging device 55 receives from prepreg cutting device 56 a prepreg tape from which unnecessary portions have been removed. The purpose of the prepreg tape exchanging device is to mount a cut prepreg tape which has been wound into a coil to be used in the succeeding prepreg sheet forming step on a prepreg laminating means 61 (hereinafter called a lamination attachment). Further, the prepreg tape exchanging device 55 is used to take out the backing paper from the cut prepreg tape which has been used.

Mounting of the prepreg tape on the lamination attachment can be effected by simultaneously mounting rolls of the cut prepreg tape on a pay out reel and a backing paper take up reel. Removal of the prepreg tape which has been used from the lamination attachment 61 can be made by simultaneously removing a vacant reel and a reel which has taken up the backing paper.

Adjacent to the prepreg tape exchanging device 55 is positioned an attachment stocker 65 storing lamination attachments 61 and a prepreg laminated sheet cutting means 63 (hereinafter called a trimming attachment). This attachment stocker 65 takes a form of a box with its upper side opened and its inner side is partitioned into a plurality of chambers respectively containing lamination attachment 61, and trimming attachment 63.

As shown in FIGS. 3 and 4, an operating table 80 including a table surface 81 on which the prepreg laminated sheet is formed is located at a position adjacent to attachment stocker 65. The table surface 81 has a horizontal flat surface and made of material of high rigidity not to deform when a lamination pressure is applied onto the table surface 81. On the table 80 is mounted a mold release sheet 82 which is arranged to be taken up by a take up roller 83 disposed at the righthand end of operating table 80, the take up roller 83 being rotated by an electric motor 84.

A guide rail 85 extends in the longitudinal direction of operating table 80 for slidably carrying a column 71. A cantilever arm 72 having a linear guide member is connected to column 71 to traverse the upper surface 81 of operating table 80. The arm 72 supports a removable head 70 which has a holding mechanism for holding a lamination attachment 61 or a trimming attachment and a swinging mechanism.

Figure 7:
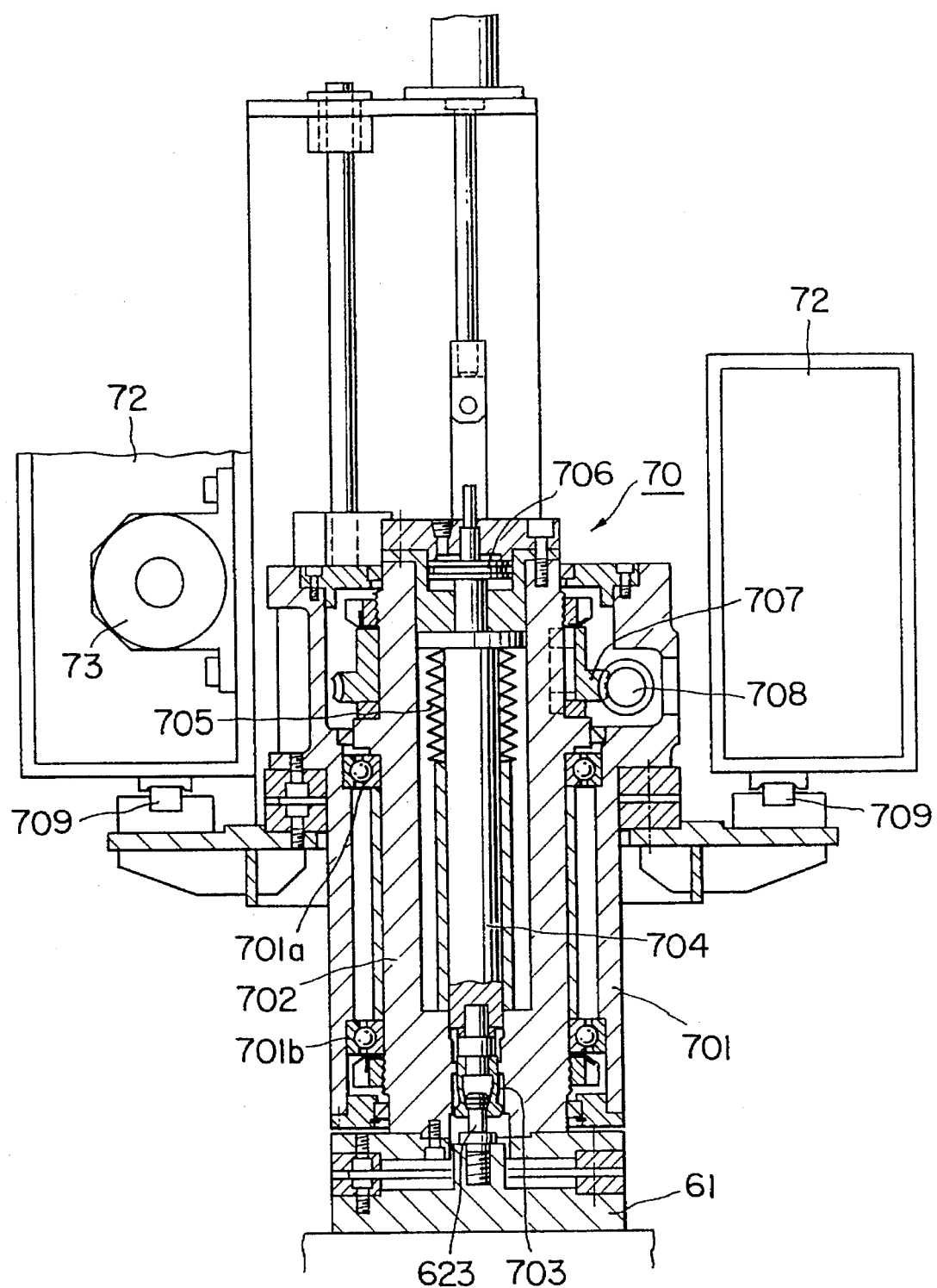
FIG. 7 is a vertical sectional view showing one example of a removable head.

As shown in FIG. 7, the removable head 70 comprises a hollow shaft 702 rotatably supported in a hollow cylindrical casing 701 by bearings 701a and 701b. In the hollow shaft 702 is contained a holding mechanism having a similar construction as a tool holder of conventional machine tools. Thus, the holding mechanism is constructed to hold a pull stud 623 projecting from the upper end of lamination attachment 61 or trimming attachment by a collect 703. This collect is secured to the lower end of draw bar 704 which is biased upwardly by dish shaped springs 705 surrounding the upper portion of draw bar 704. The draw bar 704 is moved downwardly as viewed in FIG. 7 by an oil pressure piston 706 provided for the upper portion of the draw bar 704 against the biasing force of dish shaped springs 705. As the draw bar 704 is moved downwardly, the engagement between collect 703 and pull stud 623 is released with the result that lamination attachment 61 or trimming attachment 63 can be removed from removable head 70. A worm wheel 707 is fit on the outer periphery of the hollow shaft 702, and a worm 708 meshing with the worm wheel 707 is rotatably supported by a casing 701. The worm 708 is driven by an electric motor, not shown.

The removable head is provided with coupling means, not shown, for transmitting such actuating power as oil pressure, voltage or electric power and control signals to the laminating attachment 61 and the trimming attachment 63.

The movable head 70 is moved in the horizontal direction along a linear guide member 709 (see FIG. 7) of arm 72 by such moving means 73 as a ball screw, for example. Arm 72 is movable in the longitudinal direction of the operating table 80 together with column 71. As column sliding member can be used a rack 86 (see FIG. 3) formed on the surface of guide rail 85, a pinion, not shown, meshing with the rack and a pinion driving motor. As shown in FIG. 7, a lamination attachment 61 is secured to the lower end of removable head 70.

Figure 5A:
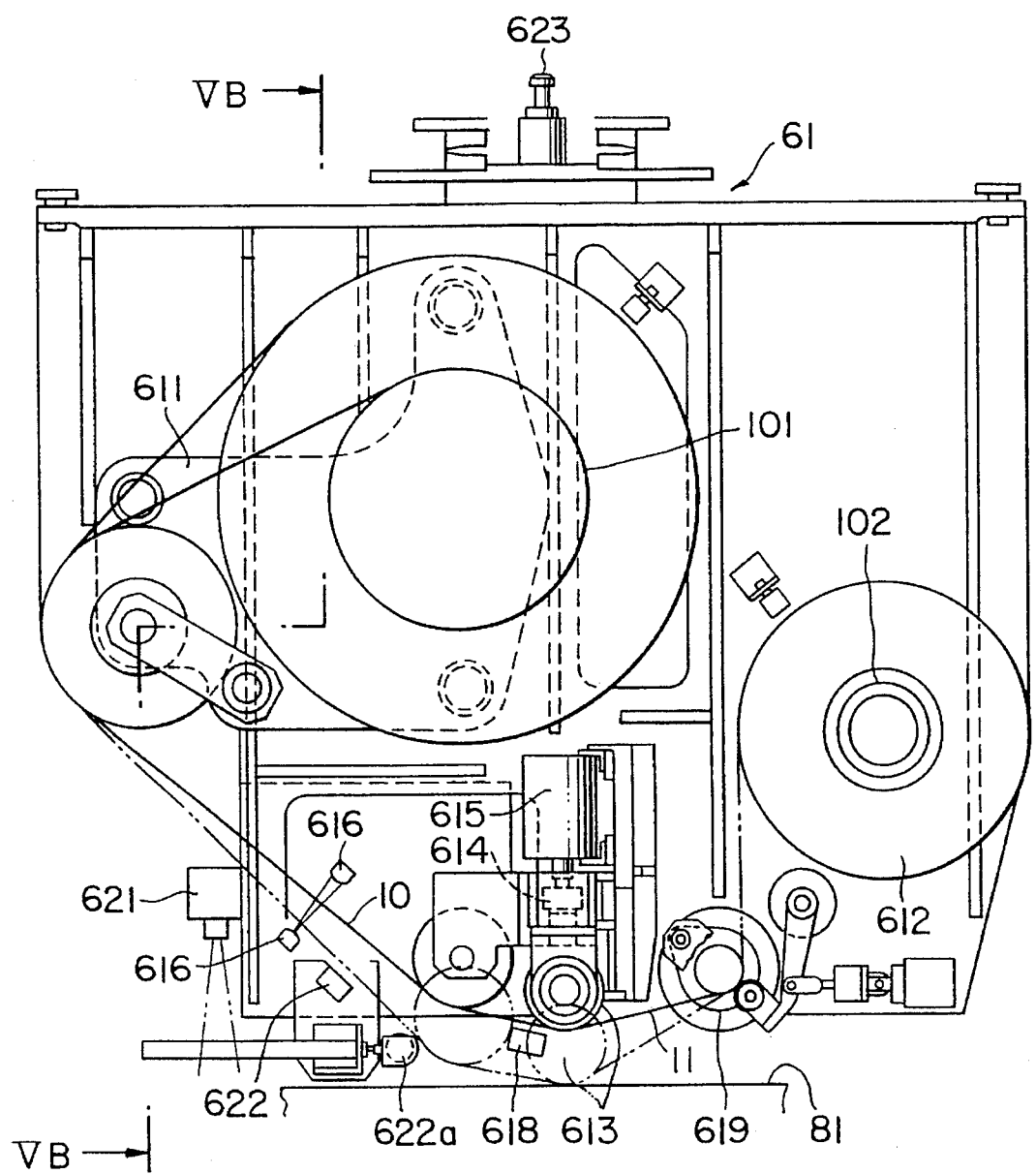
FIG. 5A is a side view showing an example of a laminating attachment.
Figure 5B:
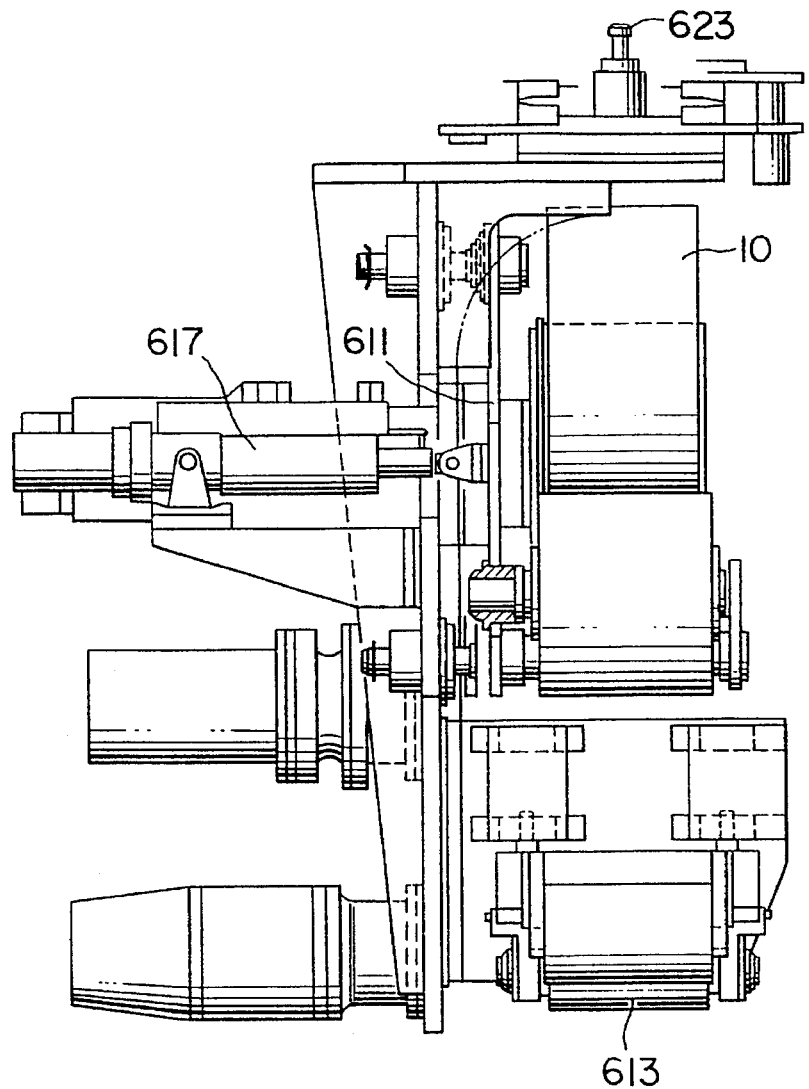
FIG. 5B is a sectional view of the laminating attachment shown in FIG. 5A, taken along a line 5B—5B in FIG. 5A.

The laminating attachment 61 is constructed to hold a cut prepreg tape 10 from which the unnecessary portions of the prepreg tape have been removed by prepreg cutting device 50, and to successively pay out prepreg tape 10, and to laminate prepreg segments 14 by orienting them at a predetermined angle and shifting the positions of the prepreg segments. FIGS. 5A and 5B show side views of the lamination attachment.

More particularly, time lamination attachment 61 comprises a supporting member 611 adapted to support a pay out reel supporting a coil of the cut prepreg tape, and another supporting member 612 adapted to rotatably support a reel 102 for taking up the backing paper remaining after peeling off the prepreg tape. A laminated roller 613 is disposed between supporting members 611 and 612. The laminating roller 613 engages the rear side of the backing paper 11 of the cut prepreg tape 10 and urges the cut prepreg tape 10 to the surface 81 of the operating table 80 on which laminating operation is performed. The laminating roller 613 is made of elastic rubber or metal. The laminating roller 613 is held by a pressure applying mechanism 614 and is moved in the vertical direction with respect to the lamination surface by an air pressure cylinder 615 connected to the pressure applying mechanism.

The cut prepreg tape 10 is payed out from supply reel 101A and wound about a take up reel 102A after passing through lamination roller 613. For controlling the position of the cut prepreg tape 10 to an accurate position while the tape is being moved, various tape position detectors are provided to be described as follows. More particularly, edge position detectors 616 (FIG. 5A) are disposed for detecting both edge positions of the cut prepreg tape 10 and a tape position correcting device 617 is provided near the supply reel 101 (see FIG. 5A) for reciprocating it in a direction perpendicular to its plain of rotation (that is in the axial direction). As a consequence, the central position of the payed out cut prepreg tape 10 is detected by the edge position detectors 616. The signals outputted from these detectors are used to actuate the tape position correcting device 617 so as to always coincide with each other the central position of the cut prepreg tape with the lamination roller 613.

Figure 6:
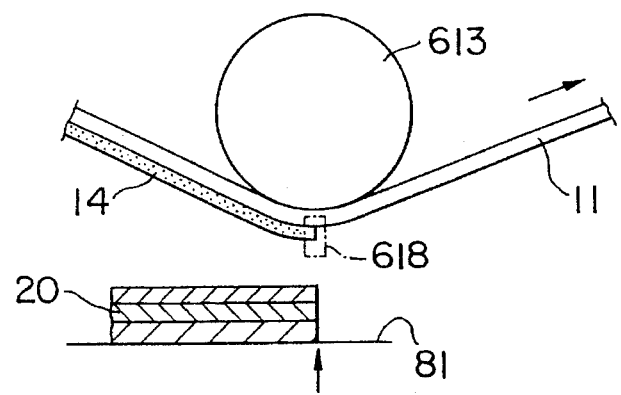
FIG. 6 is a partial enlarged view showing a laminating roller of the laminating attachment and certain member associated therewith.

A mechanical or optical prepreg end detector 618 is positioned immediately below the lamination roller 613 for detecting an end of the prepreg tape. As shown in FIG. 6, for the purpose of forming a prepreg sheet 20 the prepreg segment 14 is completely peeled off from the backing paper 11. At the time of starting lamination of a new prepreg segment 14 on the already formed prepreg sheet 20, the prepreg end detector 618 operates to accurately coincide the end of the new prepreg segment 14 to the end of the already formed prepreg sheet 20. More particularly, when a prepreg segment 14 has been peeled off from the cut prepreg tape 10 and when the lamination step of the prepreg segment has completed, the lamination roller 613 is raised a little by the air pressure cylinder 615, and the pay out speed of the cut prepreg tape 10 is decreased by a nip roller 619, and the prepreg end detector 618 checks whether the end of the next prepreg segment reaches the proper position (coincidence point of the next lamination step) of the lamination roller 613. As the end of the new prepreg segment 14 reaches a predetermined position, the pay out of the cut prepreg tape 10 is stopped and the lamination roller 613 is lowered to the level of the next lamination position. The nip roller 617 is positioned on the downstream side of the lamination roller 613 for preventing mispositioning of the cut prepreg tape 10. The nip roller 619 also clamps the backing paper. After matching the end of the new prepreg segment with the end of the already laminated prepreg sheet 20, a next lamination step is carried out.

Between the reel supporting member 611 and the lamination roller 613 are arranged a foreign substance detector 621 which detects foreign substance deposited on the surface of the prepreg tape to be laminated, a prepreg sheet heater 622 for increasing the stickiness of the prepreg segment before laminating it, and a sheet peel off correction device 622a which restores the prepreg sheet peeled off from the backing paper to the original state (see FIG. 5A).

As shown in FIG. 7, a pull stud 623 supported by collect 703 of the removable head 70 is provided to project above the lamination attachment 61.

The purpose of the trimming attachment is to cut a desired prepreg laminated member of a prepreg laminated sheet already formed. The trimming attachment is also mounted on the removable head 70 in the same manner as the lamination attachment 61.

Figure 8:
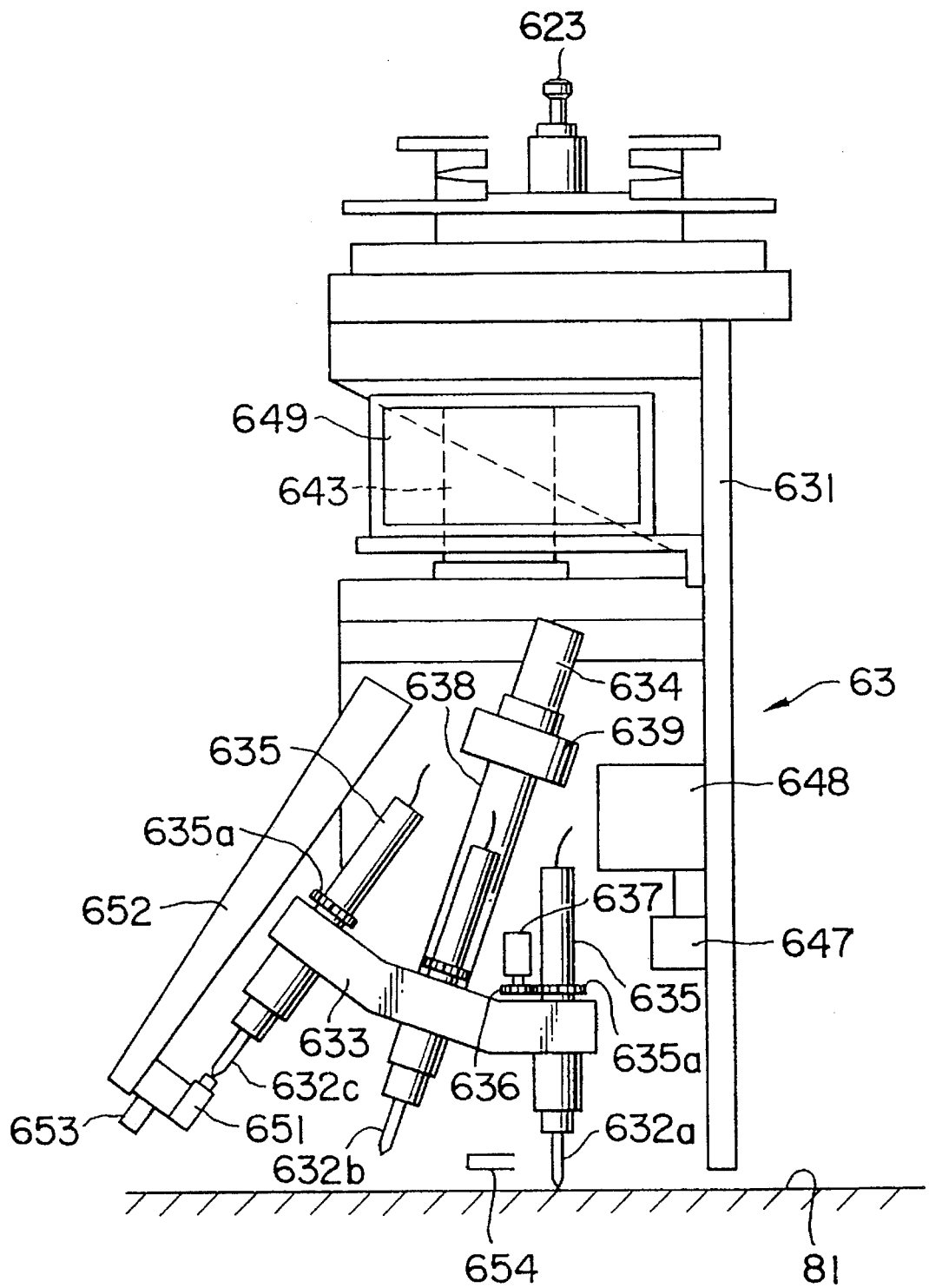
FIG. 8 is a front view showing one example of a trimming attachment.
Figure 9:
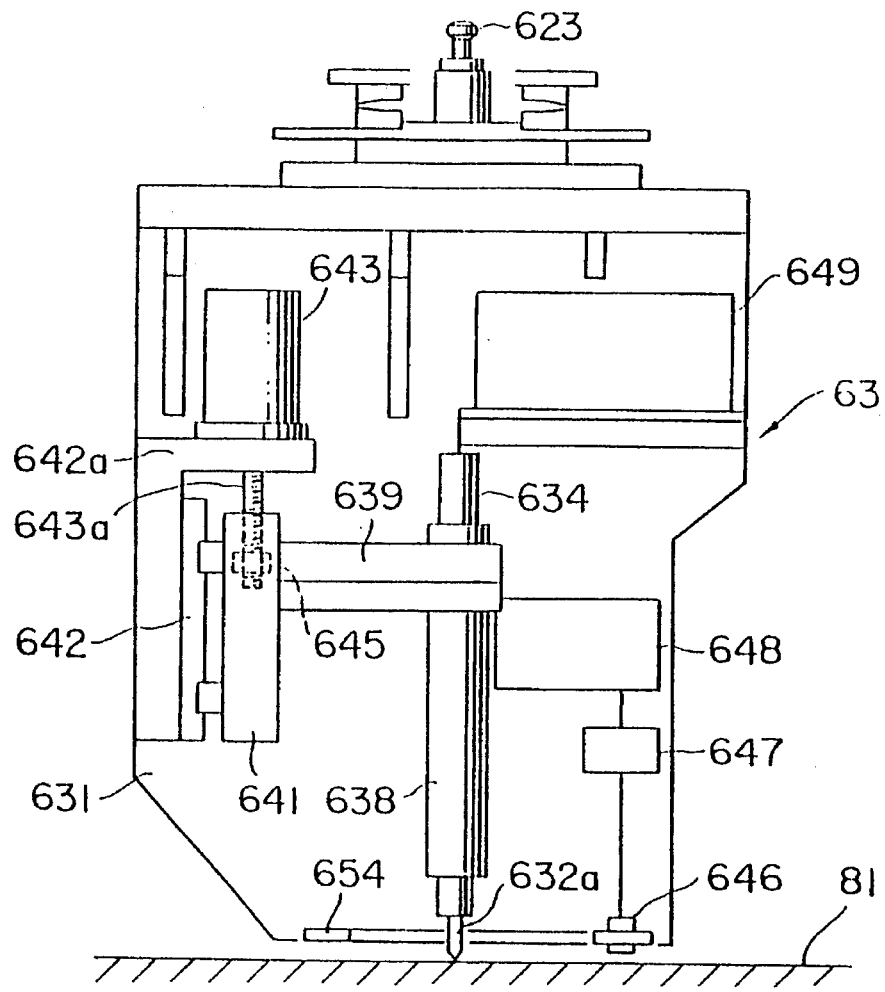
FIG. 9 is a side view showing the trimming attachment shown in FIG. 8.

FIGS. 8 through 10 show one example of the trimming attachment 60 utilized in this embodiment. The trimming attachment 63 has a main body 631 of the trimming attachment having an upper portion mounted on the removable head 70. A trimming cutter blade 632 is mounted on the main body 631. As shown in FIG. 10, several types of the trimming cutting blade can be used. One of cutting blades 632a, 632b and 632c having different shapes of cutting edge is mounted on a cutting blade exchanging turret 633 by using a spindle. The cutting blade exchanging turret 633 is rotated by an electric motor 634 mounted on a turret supporting member 638 which rotatably supports turret 633. By indexing and rotating the turret 633 a predetermined one of the cutting blades can be used. Each one of the spindles 635 respectively mounted with cutting blades 632a, 632b and 632c is formed with a gear 635a meshing with a pinion 636 driven by a servomotor 637 mounted on turret 633. For the purpose of simplifying the drawing, only pinion 636 meshing with gear 635a and servomotor 636 for a single spindle 635 are shown in FIG. 8, it will be clear that other spindles are constructed in the same manner.

The turret supporting member 638 (see FIG. 9) is held by one end of arm 639, the other end thereof being connected to a slidable member 641 which is slidable along a vertical rail 642 secured to the main body 631 of the attachment. A motor supporting member 642a bent in the horizontal direction is secured to the upper end of rail 642. A stepping motor 643 is secured to the motor supporting member 642a for vertically moving the cutting blade. As shown in FIG. 9, the output shaft of stepping motor 643 is formed as a threaded rod 643a mating with a nut 645 secured to the slidable member 641.

A level detector 646 for detecting the level of the table surface 81 is secured at a position beneath the main body 631 of the attachment. The output of the level detector 646 is supplied to a stepping motor controller 648 through an amplifier 647.

As shown in FIG. 8, a detector 651 is secured to the main body 631 of the attachment for measuring the extent of protrusion of the cutting blade. Detector 651 is secured to the lower end of a holding arm 652 secured to the main body 631 of the attachment such that the free end of the detector 651 will abut against the tip of the cutting blade mounted on the turret 633. The detector 651 is driven toward and away from the tip of the cutting blade by an electric motor 653 also secured to the lower end of the holding arm 652.

Furthermore, a compressed air ejecting type prepreg laminated sheet clamping device 654 is positioned beneath the main body of the attachment 631.

Figures 10A, 10B, 10C, 10D, 10E:
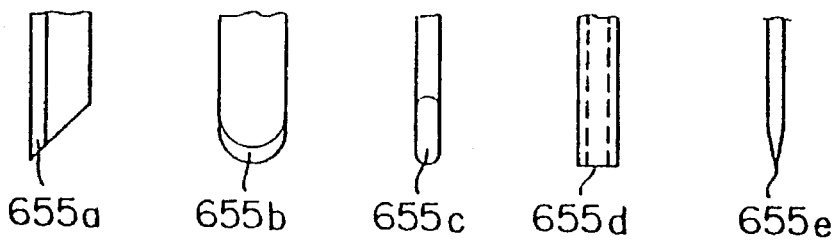
FIG. 10 shows several examples of cutting knives utilized for trimming.

As the cutting blades 632a, 632b and 632c, can be used cutting blades having various tip shapes as shown in FIG. 10. The cutting blade shown in FIG. 10(a) has a cutting edge 655a at one side of a thin plate with its lower end inclined. This cutting blade is suitable for cutting in one direction. The cutting blade shown in FIG. 10(b) is made of a thin plate having an arcuate cutting edge 655b at its lower end and is used to cut while being reciprocated. The cutting blade shown in FIG. 10(c) takes the form of an elongated fine rod provided with a cutting edge 655c at its lower end. This cutting blade is suitable for forming a circular opening. The cutting blade shown in FIG. 10(d) is made of a hollow pipe formed with a cutting edge 655d at its lower end, and is used to form a hole of a small diameter, whereas the cutting blade shown in FIG. 10(e) taken the form of a needle and is used to engage and remove a waste portion of a trimmed prepreg laminated sheet.

Furthermore, arm 72 is used to support a marking device 75 which applies identification marks (numerals or alphabets) to prepreg laminated pieces. The marking device has a mechanism for ejecting, at a high speed, a mixture of ink not affecting the quality of the prepreg laminated pieces and a solvent upon the surface of the prepreg laminated pieces.

On the downstream side (opposite to head stockers 65) is provided a separating table 105 as shown in FIG. 4. On the separating table 105, cut prepreg members 40a and 40b (see FIG. 1(iv) and a waste member 45 shown in FIG. 1(v) are separated from released sheet 82.

As shown in FIG. 3, on the side of the operating table opposite to guide rail 85 is disposed a transfer rail 91 for slidably supporting a transfer device 90. This transfer device includes prepreg laminated member take out means 92 for taking out prepreg lamination members 40a and 40b formed by cutting prepreg laminated sheet 30 to have desired shapes as shown in FIG. 1(iv) from the upper surface of separating table 105. A suction disc, for example, can be used as the prepreg laminated take out means 92 carried by swinging arm 93 movable between separating table 105 and a shaping jig 101A.

Figure 11:
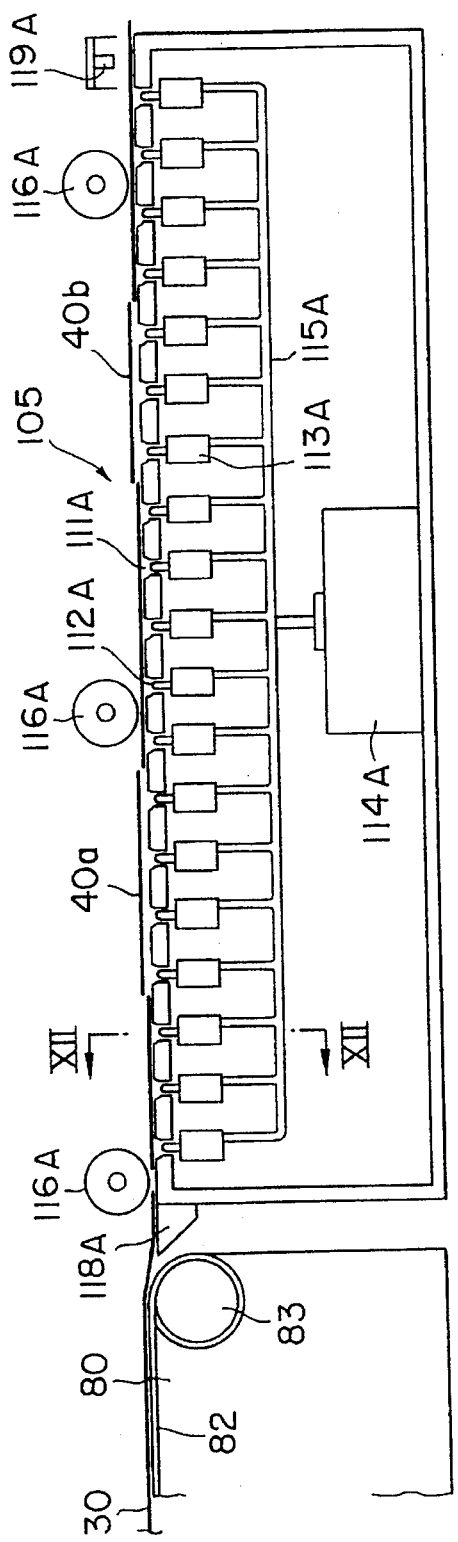
FIG. 11 is a sectional side view showing one example of a separating table.
Figure 12:
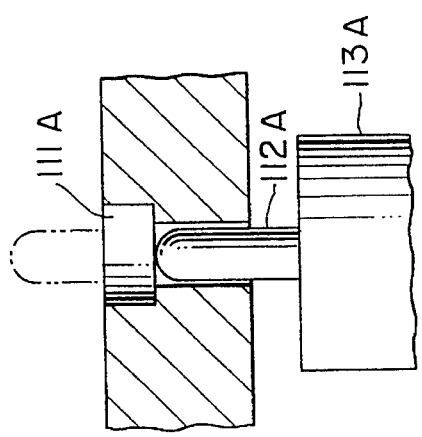
FIG. 12 is a sectional view of a portion of the separating table taken along a line XII—XII shown in FIG. 11.

As shown in FIG. 11, the separating table 105 is formed with a plurality of perforations 111A penetrating through the table 105. Vertically movable pins 112A are inserted into respective perforations 111A. Pins 112A are moved in the vertical direction by air cylinders 113A respectively connected to a source of pressurized air 114A through pipes 115A and electromagnetic valves, not shown.

A plurality of clamping rollers 116A for clamping the laminated prepreg sheet 30 are disposed above table 80. These clamping rollers 116A are displaced from each other with a predetermined spacing to be rotatable independently. These rollers 116A are driven through belts 117A as shown in FIG. 4.

Adjacent to one end of the separating table 105 close to the operating table 80 is disposed a scraper 118 which separates released sheet 82 and laminated prepreg sheet 80. As shown in FIG. 11, a mark reading device 119A is provided on the opposite end of the separating table 105 for reading marks applied on the upper surface of the laminated prepreg sheet 30.

The laminated prepreg members 40a and 40b are cut to have predetermined shape by shaping device 100A and are used to prepare a desired laminated prepreg article. As shown in FIG. 4, shaping device 100A is constituted by shaping jigs 102A, a support 101A for supporting jigs 102A, a shaping machine 103A provided with a heater and a press, not shown, and a jig exchanging device 104A which exchanges jigs 102A between support 101A and shaping machine 103A.

The operations of prepreg cutting apparatus 50, prepreg tape exchanging device 55, removable head 70, column sliding means, removable head moving means, lamination attachment 61, trimming attachment 63, transfer device 90, laminated prepreg member take out member 92 and shaping member 100A which constitute the laminated prepreg member manufacturing machine of this invention are controlled by a control device 120A containing predetermined programs.

Figure 13:
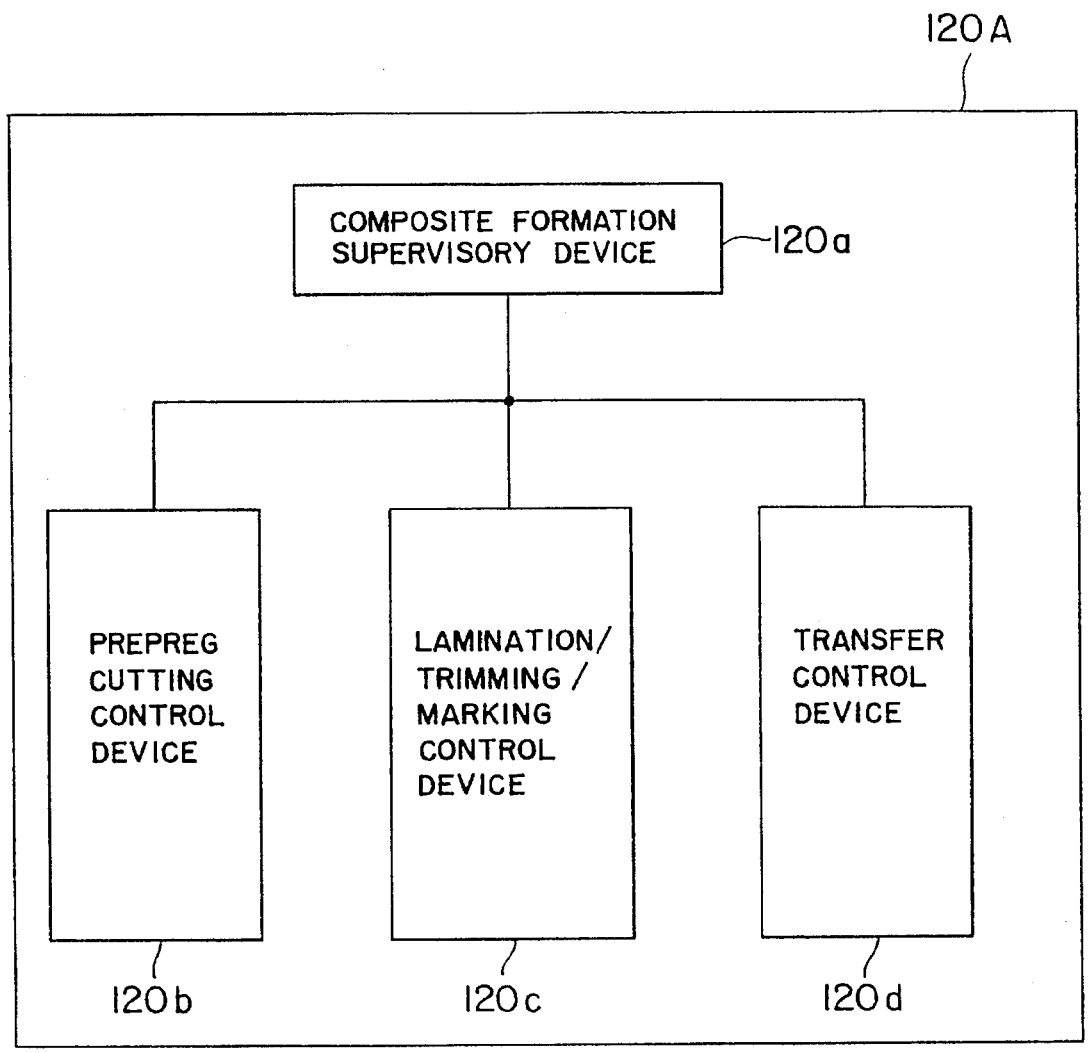
FIG. 13 is a block diagram of a control apparatus utilized in this invention.

More particularly, as shown in FIG. 13, control device 120A is made up of a composite formation supervisory device 120a, prepreg cutting control device 120b, lamination/trimming/marking control device 120c, and transfer control device 120d.

The composite formation supervisory device 120a has the following functions.

(a) a running control function which issues instructions for starting, interruption and termination of an operating schedule, (b) an operation supervisory function effecting display and recording of the operating condition, (c) schedule data supervisory functions including inputting and changing of data necessary for schedule running, and displaying of working conditions, (d) a NC data supervisory function performing edition, registration, and deletion of NC data prepared by the data forming function, a down-load to various control devices, and (e) data forming function forming NC data for various steps necessary for automatically operating the laminated prepreg member manufacturing machine.

The NC data forming function can be divided into an automatic programming function (formation of Cutter Location Data (CL data)), a post processor function (formation of NC data) so as to form following data.

A. Prepreg cutting data formation

① Prepreg automatic cutting programming.

Prepreg (having a configuration suitable for lamination) cutting CL data are prepared from the lamination CL data prepared by the automatic lamination program.

② Prepreg cutting post processor

Prepreg cutting NC data are formed (which can be executed by the prepreg cutting device) based on the prepreg cutting CL data prepared by a prepreg cutting automatic program.

B. Formation of lamination data

③ Lamination automatic programming

Lamination CL data for respective layers are automatically formed based upon lamination conditions prepared by dialogue system (interactive processing) inputs.

② Lamination NC data are formed that can be executed by the lamination/trimming/marking control device in accordance with lamination CL data prepared by the automatic lamination program.

C. Preparation of trimming data

① Automation automatic program

Trimming CL data are automatically formed in accordance with trimming conditions determined by the communication type input.

② Trimming NC data that can be executed by the lamination/trimming/marking device are formed in accordance with trimming CL data by an automatic trimming program.

D. Preparation of marking data

① Automatic marking programs

Marking CL data are automatically formed in accordance with marking conditions determined by communication inputs.

② Marking NC data that can be executed with the lamination/trimming/marking control device are prepared in accordance with the marking CL data formed by the automatic marking program.

The prepreg cutting control device 120b has the following various functions:

(a) Switching of operation modes (DNC/automatic/manual), (b) reporting the status of the operating conditions to an upper order composite supervisory device, (c) automatic operation of the prepreg cutting in accordance with the prepreg cutting NC data, (d) reporting of a cut prepreg preparation operation completion.

The lamination/trimming/marking control device 120c has the following various functions:

(a) switching of the operation mode (DNC/automatic/manual), (b) reporting the status of the operating state to the upper order composite supervisory device, (c) an automatic operation of the prepreg cutting device in accordance with composite forming NC data (lamination/marking/trimming), (d) automatic exchange of the lamination head, trimming head and the like, (e) automatic operation of a waste processing device, and (f) reporting of completion of the preparation of the prepreg lamination operation.

Furthermore, the transfer control device 120d has the following various functions:

(a) switching of the opera ting mode (DNC/automatic/manual), (b) reporting the operating condition status to the upper order composite supervisory device, (c) transfer of the laminated prepreg members according to the order of priority, (d) reporting of the completion of the preparation of the transfer operation.

The laminated prepreg member manufacturing machine described above operates as follows.

Upon initiation of the automatic operation, the preparation designation data regarding the product and to be supplied to various devices of the machine which have been registered in a schedule table of the composite formation supervisory device 120a are displayed by display devices of respective devices. The operator of the machine prepares a prepreg tape, a paper pipe, cutter, etc. in accordance with the preparation designation data. Upon completion of the preparation operation, preparation operation informing signals are sent to the composite formation supervisory device 120a from the display devices of respective devices. The composite formation supervisory device 120a confirms the operating mode of the control device which has received the preparation completion informing signal, so as to transfer schedule data to a device which has been brought to a DNC mode, thereby issuing a starting signal. When each one of the devices receives a starting signal, it starts an automatic operation in accordance with transferred data.

At first, the pinion driving motor 87 mounted on the column 71 is energized to move column 71 and arm 72 along guide rail 85 for moving removable head 70 to a position above the head stocker 65. The holding member (pull stud) of a predetermined lamination attachment 61 in the attachment stocker 65 is held by the holding mechanism of the removable head 70 so as to mount the lamination attachment 61 on the removable head 70. As has been described hereinabove, by using the prepreg exchanging device 55, a prepreg tape from which unnecessary prepreg portions have been removed is taken out from the prepreg cutting device 50 and the taken out prepreg tape is mounted on the lamination attachment 61 held by the removable head 70.

The removable head 70 holding the lamination attachment 61 mounted with a cut prepreg tape moves the column 71 and arm 72 along guide rail 85 to move them to a predetermined position on the operating table 80. By operating worm 708 and worm wheel 707, the removable head 70 is swung to index the lamination attachment to a predetermined position. While the lamination attachment 61 is being operated by power transmitted from removable head 70 and by a control signal, the lamination attachment 61 is moved in a predetermined direction on table 81. When the removable head 70 is moved along arm 72 by using the ball screw 73 for moving the arm 72 and column 71 along guide rail 85, whereby the lamination attachment 61 can be moved to any position of the upper surface of table 81. For example, where the moving speed of the removable head 70 along arm 72 is made to be equal to that of the arm 72 along guide rail 85, the lamination attachment 61 can be moved in a direction at an angle of 45° with respect to the guide rail 85. Where the direction of lamination of the prepreg tapes is to be changed, the swinging and indexing operations of the lamination attachment can be effected by the operations of indexing mechanisms 707 and 708 of the removable head 70.

A cut prepreg paper 10 is successively payed out under tension from the lamination attachment 61 and prepreg pieces 14 separated each other by slits 13 are urged against the released sheets 82 on the table 81. When the lamination attachment 61 is moved in a desired direction, for example 45° with respect to the horizontal direction, while the prepreg pieces 14 are being urged against the table 81 the cut prepreg pieces 14 would be peeled off from backing tapes of the cut prepreg tapes 10 and oriented in a predetermined direction on the released sheet 82 on table 81. By continuously performing this operation a prepreg sheet is formed on table 81. Spent backing paper is removed from the lamination attachment 61 by the operation of the prepreg tape exchanging devices 55, and a new cut prepreg tape 10 is mounted on the lamination attachment 61. Thereafter, prepreg sheets are oriented in the predetermined direction and then laminated on already formed prepreg sheet. In this manner, a laminated prepreg sheet 30 is formed including a plurality of laminated sheets. The prepreg sheet can be formed at a high accuracy by accurately positioning the prepreg tapes by using the tape position detector.

Upon forming a desired laminated prepreg sheet 30, a lamination completion signal is sent to a composite formation supervisory device 120a. Then the composite formation supervisory device 120a issues an attachment exchanging instruction for moving again arm 72 toward the attachment stocker 65 for removing a lamination attachment 61 held by removable head 70, thus holding the trimming attachment 63 with movable head 70.

The removable head 70 holding the trimming attachment 63 is moved on the operating table 80 for trimming the laminated prepreg sheet 30 to obtain laminated prepreg members 40a and 40b each having a desired configuration under the control of a control signal from the lamination/trimming/marking control device 120c. As has been described above, the movement of the trimming attachment 63 is made by combining the movement of arm 72 along guide rail 85, and the indexing operation of the trimming attachment 63.

A plurality of (for example 3) cutting blades 632a, 632b and 632c of different types are mounted on turret 633 of trimming attachment 63 as shown in FIG. 8. As the turret 633 is rotated, a cutting tool to be used is selected according to a specification (regarding shape and dimension). In the embodiment shown in FIG. 8, cutting blade 632a is selected. This cutting blade 632a is lowered to a depth enough to cut the laminated prepreg sheet 30 but not to cut mold release sheet (backing sheet) 82 for effecting trimming. This cutting depth is controlled as follows. The amount of protrusion of the cutting edges of the cutting blades 632a, 632b and 632c is predetected by the cutting edge protrusion detector 651. Thereafter at the time of trimming, the distance between the surface of table 81 and the level detector 646, that is the position of the cutting edge of the cutting blade 632a is detected with level detector 646 so as to control the amount of lowering of the trimming attachment 63 to obtain an optimum cutting edge position. When the laminated prepreg sheet 30 is wavy with respect to the surface of table 81, the stepping motor 643 is operated according to the wavy state. At the same time, sliding member 641, arm 639, turret supporting member 638 and cutting blade 632a are raised or lowered during which the laminated prepreg sheet 30 is cut according to the true level of laminated prepreg sheet 30.

The trimming operation of the laminated prepreg sheet 30 is made by moving the removal head 70 holding the trimming attachment 63. Where the direction of cutting changes (for example, where the direction of cutting is changed by 90°), pinion 636, gear 635a and spindle 635 are rotated by servomotor 637 for indexing them whereby the direction of the cutting edge of the cutting blade is changed (90° in this example). In the same manner, where it is necessary to cut prepreg sheet to have a curved shape, concurrently with the movement of the trimming attachment 63, a cutting blade is continuously rotated by servomotor 637 so as to always orient the cutting edge in the cutting direction.

Detector 651 for detecting the amount of protrusion of the cutting edge can also be used for detecting the wear quantity and breakage of the cutting edge. When an abnormal condition of the cutting blade is detected, a new cutting blade is exchanged with a faulty cutting blade. Upon completion of the trimming step, the lamination/trimming/marking control device 120c sends a trimming completion signal to the composite forming supervisory device 120a.

The cutting of the laminated prepreg sheet 30 is sequentially performed on the operating table 80 in accordance with desired configurations of laminated prepreg members 40a and 40b. At this time, identification marks 41 are applied to respective laminated prepreg members 40a and 40b by marking device 75. This marking operation is controlled by lamination/trimming/marking control device 120c. When the marking operation is completed, a termination signal is sent to the composite formation supervisory device 120a.

Then transfer control device 120d produces a laminated prepreg member take out signal, with the result that the cut laminated prepreg members 40a and 40b are sent to separating table 105 and taken out from the laminated prepreg sheet by means of laminated prepreg member take out device 92.

The laminated prepreg sheet is transferred to the separating table 105 together with mold release sheet 82 while moving to separation table 105 from operating table 80, the scraper 118A would be inserted between mold release sheet 82 and the laminated prepreg sheet 30. As a consequence, the laminated prepreg sheet 30 is separated from mold release sheet 82 so that only the laminated prepreg sheet 30 is transferred to the separating table 105.

On the separating table 105, the laminated prepreg sheet 30 is transferred due to the rotation of clamping roller 116A so that the sheet 30 is stopped at a predetermined position. This stopping operation is controlled by reading the identification mark on the laminated prepreg sheet 30 with a mark reader 119A and then a read out signal is sent to the composite formation supervisory device 120a.

Then air from a source of pressurized air 114A is sent to only one of a predetermined air cylinders 113A as shown in FIG. 1 to raise a predetermined pin 112A whereby already trimmed laminated prepreg members 40a and 40b are pushed upwardly by pin 112A to be separated from the laminated prepreg sheet 30. These separated laminated prepreg members 40a and 40b are sucked by a sucking disc held by laminated prepreg member 92, for example, a sucking disc held by swinging arm 93, and are then removed from separating table 105.

These removed laminated prepreg members 40a and 40b are conveyed to a predetermined shaping jig support 101A by transfer device 90. At the shaping device 100A heating and press operations are performed by means of jig 102A to form a prepreg product having a predetermined configuration.

A waste of the laminated prepreg sheet from which laminated prepreg members 40a and 40b have been taken out is conveyed to a succeeding processing step from the separating table 105. When the waste is processed, a transfer completion signal is sent to composite forming supervisory device 120a from transfer control device 120d, thus completing a series of the manufacturing steps.

These steps are controlled by control device 120A. Once respective control devices 120b, 120c and 120d commence automatic operations, the automatic operation is continued until all data sent from the composite formation supervisory device 120a have been processed. Although the quantity of the transferred data depends upon the capacity of memory means of respective control devices, at a maximum, the quantity of the data is equal to the sum of lamination data, trimming data and marking data corresponding to one prepreg sheet at the prepreg cutting device, and one sheet at the lamination/trimming/marking control device 120c. When the data in respective control devices becomes zero, these devices request data for composite formation supervisory device 120a. This composite formation supervisory device checks the schedule data of a device which has requested data, and transfers data when there are remaining data. But the composite formation supervisory device 120a sends a stop signal to a device whose schedule data has been processed. Where an alarm signal is generated during the automatic operation, one device immediately stops its operation according to the level of the alarm signal, whereas other devices stop operation or stop after termination of one block. When the devices shown in FIG. 13 stop their operation, they issue a message and inform the alarm signal to the composite formation supervisory device 120a.

By a series of operations described above, a laminated prepreg member can be automatically manufactured.

This embodiment has the following advantages.

(1) It is possible to continuously perform the prepreg forming operation and the cutting operation of a laminated prepreg sheet on the same operating table so that it is not necessary to move the prepreg sheet on the way of manufacturing.

For this reason, it is not necessary to store the laminated prepreg sheet in a refrigeration cabinet or convey it to other working position which have been necessary in the prior art prepreg sheet manufacturing machine. Thus, not only the operations are efficient but also the working time can be reduced.

(2) Lamination and cutting operations can be made by successively mounting different lamination attachment 61 and trimming attachment on the same removable head 70. For this reason, laminating and cutting operations of the prepreg layers can be made continuously without any waiting time, thus enabling a line balance among various steps.

(3) All operations starting from cutting of the prepreg tape and ending with taking out of the laminated prepreg member can be made automatically.

Consequently, it is possible to prepare manufacturing programs including all steps, which renders easy the supervision of manufacturing.

(4) Since a prepreg tape from which unnecessary portions have been removed is mounted on the lamination attachment, the laminating operation can be made at a high speed and at a high efficiency.

It should be understood that the construction of the laminated prepreg member manufacturing machine is not limited to that illustrated in the embodiment. More particularly, various constructional elements can be disposed at various positions. Thus, for example, the attachment stocker 65 can be disposed at a position opposite to that shown in FIG. 3. Where a large size removable head and a large size lamination attachment are used, both ends of arm 72 can be supported by suitable supporting means, which improves the supporting rigidity of various attachments.

When a large prepreg sheet 20 is formed by assembling a plurality of prepreg segments 20 as shown in FIG. 1(iii) at the initial and end portions of the assembled prepreg segments 14, there is a tendency of peel off, that is these portions do not bonded each other into an integral sheet so that the operator must always watch the bonding state. In a prior art machine disclosed in Japanese Laid Open Patent Specification No. 35951/1986, high vertical posts are provided on both sides of an operating table, and horizontal rails are mounted on the upper ends of the posts for permitting a horizontally movable overhead running crane or cross rails to run along the rails, the crane being used to hang and convey a laminating head.

When an overhead running crane is used, the operator can readily approach the laminating head and a sufficiently wide space is available about the operating table, thus permitting the operator to work easily. However, the whole apparatus including the posts and overhead running crane becomes large, thus occupying a wide space. Further, as the weight of the parts to be moved during laying is large, the control ability is poor. Moreover, the overhead crane or cross rails disturbs loading and unloading of composite prepreg tape onto and from the operating table or a laminating head.

Figure 20:
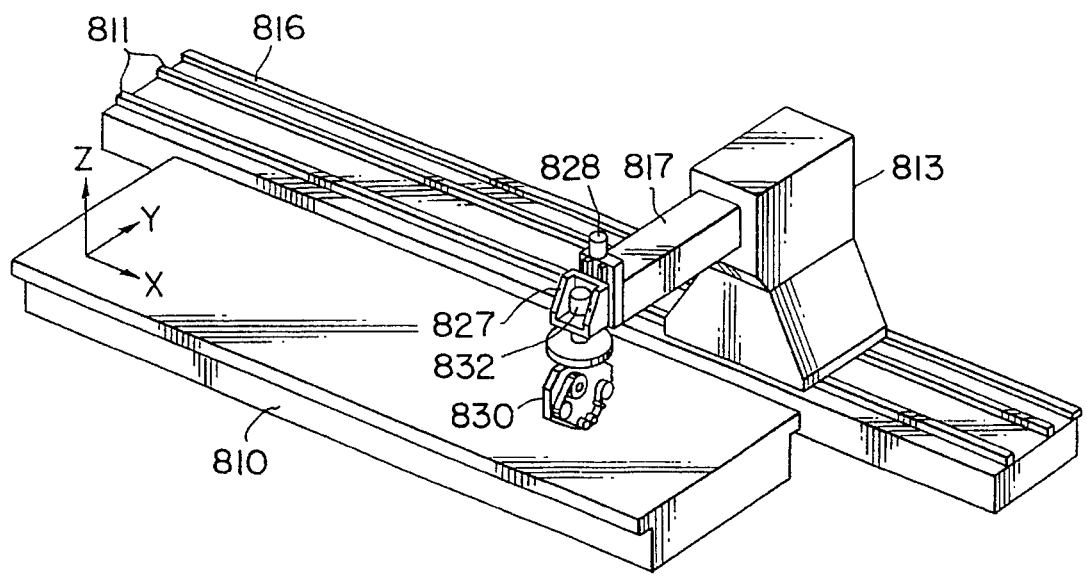
FIG. 20 is a perspective view showing one embodiment of a laying apparatus embodying the invention.
Figure 21:
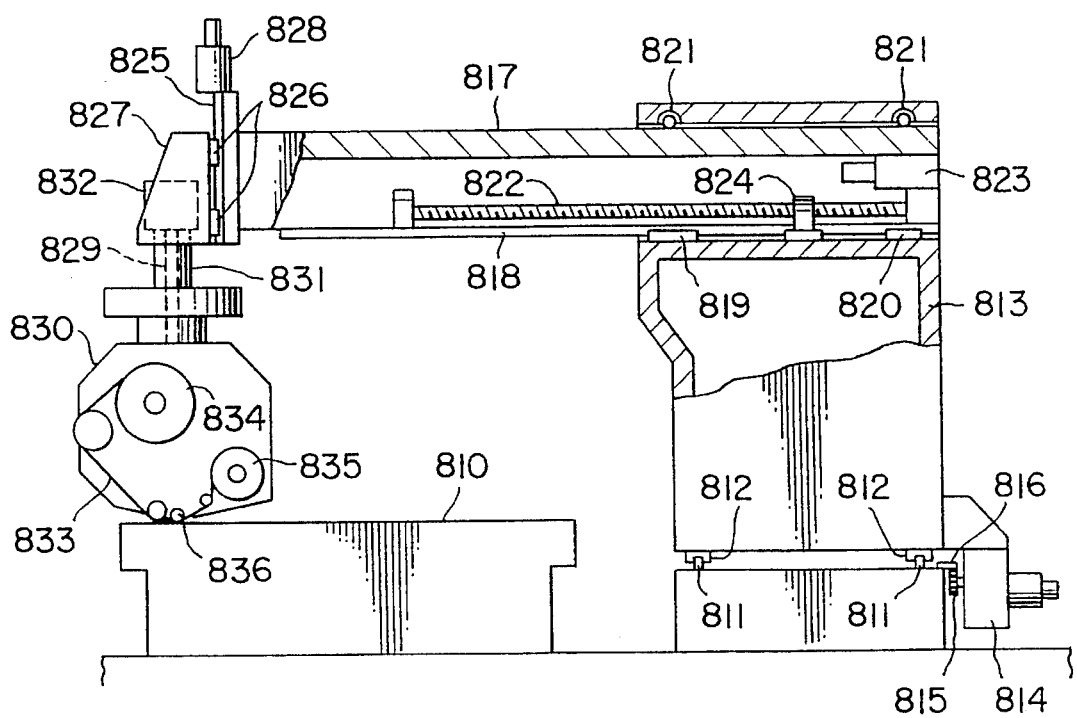
FIG. 21 is a side view, partly in section, showing the laying apparatus shown in FIG. 20.
Figure 22:
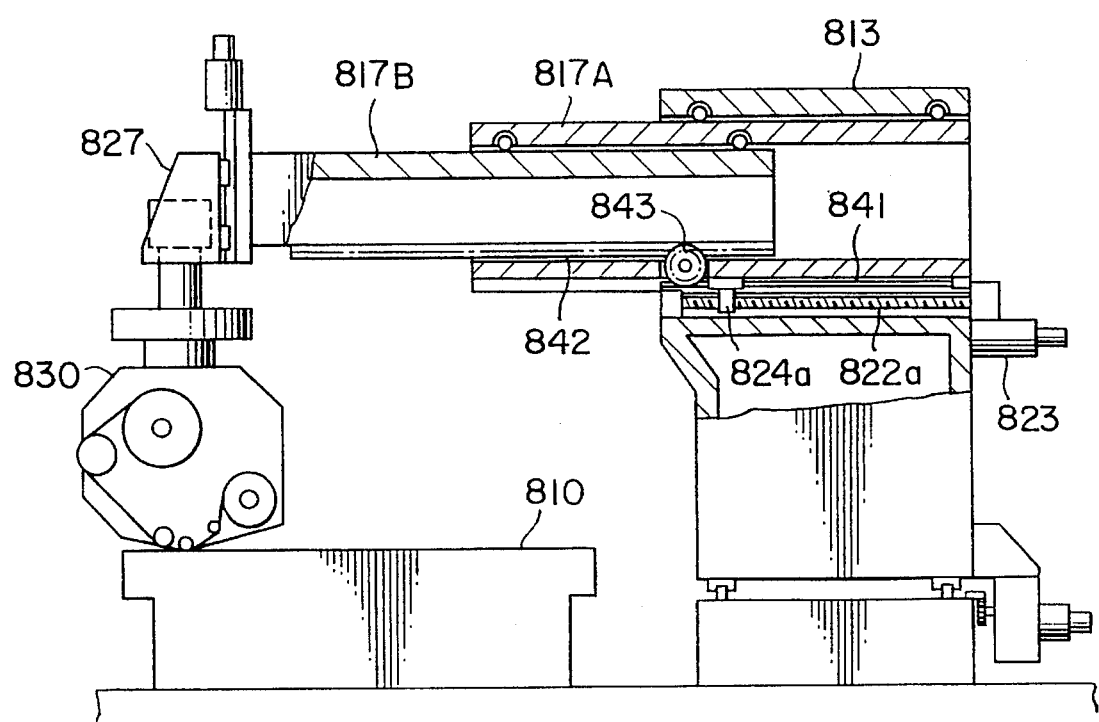
FIG. 22 is a side view, partly in section, showing a modified embodiment.

The apparatus shown in FIGS. 20, 21 and 22 comprises an operating table 810 provided with longitudinal linear ways 811 on one side of the operating table 810. The linear ways 811 extend in parallel for supporting longitudinally movable column base 812 through ball bearings 812. The column base 813 is provided with a pinion 815 rotated by a driving member 814, for example an electric motor. The pinion 815 meshes with a rack 816 provided in parallel with linear ways 811. The direction of the linear ways 811 is herein called a X direction.

As shown in FIG. 21 a horizontal arm 817 extending in the Y direction is mounted on the upper end of column base 812. The arm 817 has an inverted U shaped cross-section. On the lower ends of both legs of U are formed linear ways 818 respectively. The arm 817 is movable in the Y direction by bearings 819 and 820 mounted on the upper end of column base 813. The upper portion of arm 817 is pressed downwardly by clamping rollers 821 rotatably mounted on column base 813. A feed screw 822 is contained in arm 817 in parallel with linear way 818. Feed screw 822 is rotated by driving means 823 contained in arm 817. The feed screw 822 engages a nut 824 secured to column base 813.

To the front end of arm 817 is secured a saddle 827 to be movable in the vertical (Z) direction through a vertical linear way 825 and bearings 826. Saddle 827 is driven in the vertical direction by driving means 828.

A vertical shaft 829 is rotatably mounted on saddle 827 and a laminating head 830 is secured to the lower end of shaft 829 which is supported by a sleeve bearing 831. Shaft 829 is rotated by driving means 832 for rotating laminating head 830 about the axis of shaft 829.

The lamination head 830 includes a reel 834 for paying out a composite prepreg tape 833, a backing paper take up reel 835, a bonding roller 836 and their driving means, not shown.

The positions and moving speeds of column base 813, arm 817 and saddle 827 driven by driving means 814, 823 and 828 respectively are simultaneously controlled for three dimensionally movable laminating head 830 on operating table 810. The rotation of the laminating head 830 driven by driving means 832 is also controlled automatically so as to coincide the direction of movement of laminating head 830 with the direction of movement of the laminating head 830 in the XY plane.

The laminating operation of prepreg sheets is performed by the angle control of laminating head 830 effected by driving means 832 and three dimensional movement of the laminating head 830 effected by simultaneous control of column base 813, arm 817 and saddle 827 performed by driving means 814, 823 and 828 respectively.

Since arm 817 is constructed such that the laminating head 830 is mounted on its outer end for moving the laminating head in the Y direction by the movement of the arm 817, the length of this arm can be reduced to about ½ of that of a prior art gantry type laminating machine. The column base 813 is not provided for the prior art gantry type laminating machine, but since it has a relatively compact construction, the sum of the weights of the column base 813 and the arm 817 is substantially smaller than the weight of the arm of the prior art gantry type laminating machine. As a consequence, the controllability of the movement of the laminating head 830 can be improved, whereby the laminating operation can be made at a high accuracy and efficiency.

Since arm 817 supporting laminating head 830 is supported by column base 813 moved along linear ways 811 separated from the operating table 813, the upper surface thereof is opened, so that the operator can stand close to the operating table to precisely supervise the laminating operation of the prepreg piece. Furthermore, loading and unloading of pay out reel 834 and backing paper take up reel 835, and loading and unloading of prepreg pieces, not shown, on and from the operating table 810 can be performed readily.

FIG. 22 shows a modification of the prepreg laminating machine shown in FIGS. 20 and 21. In this modification, the arm 827 is divided into telescoped parts 817A and 817B for reducing the extent of protrusion to the right side as viewed in FIG. 22. The first arm 817A is rotatably supported by column base 813 and is moved in the longitudinal direction by a feed screw 822a driven by an electric motor 823 and a nut 824a engaging the feed screw 823a and secured to the first arm 817A. The second arm 817B is moved in an interlocked relation with respect to the first arm 817A by racks 841 and 842 respectively provided on column base 813 and the second arm 817B in an opposed relationship, and a pinion 843 simultaneously meshing with both racks 841 and 842, the pinion 843 being rotatably supported by the first arm 817A. With this construction, there is an advantage that both arms 817A and 817B can be driven by a single driving motor 823. However it is possible to drive the first and second arms 817A and 817B with independent driving means.

As above described, since the upper surface of the operating table is open, supervision of the laminating operation of prepreg layers is made easy. It is also possible to make easy loading and unloading of the lamination head on the operating table and loading and unloading of a composite prepreg tape and completed prepreg laminated product. Such loading and unloading operations can be made automatically. Furthermore, it is possible to decrease the weight of a mechanism for moving the laminating head, thus improving controllability, simplifying the construction of the laminating machine and decreasing the installation space of the machine.

While the presently preferred embodiments of the present invention have been shown and described, it is to be understood these disclosures are for the purpose of illustration and that various changes and modifications may be made without departing from the scope of the invention as set forth in the appended claims.

What is claimed is:

1. Apparatus for manufacturing a laminated prepreg member from a prepreg layer releasably bonded on a flexible backing paper, comprising:

pay-out means for paying out a prepreg tape comprised of said prepreg layer and said backing paper, said prepreg tape having side edges on opposite sides thereof;

prepreg tape cutting means for making a plurality of slits or grooves only in said prepreg tape but not in said backing paper while maintaining said backing paper intact, said prepreg tape cutting means receiving said prepreg tape from said pay-out means, and said plurality of slits or grooves formed by said prepreg tape cutting means extend completely through said prepreg layer and extend completely across said prepreg layer from side to side thereof;

control means for controlling said prepreg tape cutting means such that said slits form a plurality of unnecessary prepreg portions positioned between prepreg segments;

feeding means for feeding said prepreg tape with a plurality of said prepreg segments and said unnecessary prepreg portions mounted on said flexible backing paper;

removing means for removing said unnecessary prepreg portions from said backing paper while retaining said prepreg segments in contact with said backing paper when said prepreg tape is fed by said feeding means to said removing means such that a cut prepreg tape, free of said unnecessary prepreg portions, is obtained;

a lamination attachment means;

loading means for loading said cut prepreg tape, which contains said retained prepreg segments and is free of said unnecessary prepreg portions, onto said lamination attachment;

moving means for moving said lamination attachment with respect to said operating table and said lamination attachment including means for urging said cut prepreg tape against a surface presented by the operating table such that cut prepreg segments from said backing paper peel off onto the surface presented by said operating table;

arranging means for controlling said moving means and successively orienting said lamination attachment loaded with cut prepreg tape in different predetermined directions such that said prepreg segments combine to form a first prepreg sheet layer of a predetermined configuration, ends of said prepreg segments being shaped and spaced apart in a manner which results in a predetermined periphery for said prepreg sheet being formed after bonding of said peeled off cut prepreg segments to the supporting surface presented by said operating table;

pressing means for urging additionally cut prepreg tape into contact with said first prepreg sheet layer so as to form a multilayer laminated prepreg sheet;

trimming means for trimming said laminated prepreg sheet on said operating table surface while said operating table is still at said first position so as to form a laminated prepreg member; and a separating table located on a downstream side of said operating table for separating said laminated prepreg member from said multilayer laminated prepreg sheet, and separating means for separating a waste portion of said laminated prepreg sheet from said separating table.

2. The apparatus according to claim 1, wherein said trimming means includes a trimming attachment, and said moving means includes attachment holding means for releasably holding said trimming attachment and said lamination attachment, respectively, said lamination attachment comprises:
  a supply reel for carrying a wound roll of a cut prepreg tape;
  a take up reel for taking up said backing paper remaining after peeling off said cut prepreg tape;
  a laminating roller located between said supply reel and said take up reel, and means for adjusting said laminating roller to a lamination position wherein said cut prepreg tape is urged against said operating table;
  lamination pressure applying means adapted to hold said laminating roller in said lamination position and being moveable in a vertical direction with respect to an operating surface of said operating table;
  an edge detector for detecting both side edge positions of said cut prepreg tape and determining a center position of said cut prepreg tape;
  tape position correcting means reciprocating said supply reel along an axis of rotation of said supply reel so as to coincide the center position of said cut prepreg tape with a center position of said laminating roller;
  a prepreg end detector located immediately beneath said laminating roller for detecting an end of a prepreg segment;
  said lamination and trimming attachments each including a pull stud adapted to be held by a collet of said attachment holding means;
  a draw bar supporting said collet at its lower end; and
  draw bar actuating means for driving said draw bar in the vertical direction for disengaging said collet from said pull stud, 3. The apparatus according to claim 1, wherein said moving means includes attachment holding means for releasably holding said trimming means and said lamination attachment, respectively;

said trimming means includes a trimming attachment which comprises:
  a main body having an upper end shaped for receipt by said attachment holding means;
  a cutter exchanging turret supported by said main body;
  a plurality of spindles mounted on said turret for respectively supporting a plurality of different cutters; and
  driving means for rotating and indexing said turret for selection of a desired cutter.

4. The apparatus according to claim 1, further comprising;
  a level detector for detecting a surface level of said operating table;
  a controller for varying a level of a selected cutter of said trimming means, said controller being energized by an output signal of said level detector; and
  a detector for detecting an extent of protrusion of said selected cutter supported by said trimming means.

5. The apparatus according to claim 1, wherein said pay out means includes
  a pair of feed rollers which are intermittently rotated for feeding said paid out prepreg tape to said prepreg tape cutting means;
  said prepreg tape cutting means including a cutter removably mounted on a lower end of an ultrasonic wave oscillator holder,
  a vertically movable block supporting said ultrasonic wave oscillator holder through a bracket,
  a guide member which slidably guides said block,
  means for vertically moving said block,
  an L shaped bracket with a vertical leg and a horizontal leg for supporting a vertically movable guide member,
  a vertical shaft connected to said horizontal leg of said L-shaped bracket via a frame so as to be moveable along a horizontal direction along said frame and for reciprocating with respect to said frame about an axis of said frame by horizontal arm driving means,
  a horizontal table which is located beneath said prepreg tape cutter and is secured to said frame,
  a hollow horizontal anvil mounted on said horizontal table and said anvil being provided with a plurality of air ports that communicate with a horizontal air passage formed in said anvil,
  driving means for exhausting air in said horizontal air passage,
  measurement means provided at one end of said anvil for measuring an extent of protrusion of said cutter,
  a detector attached to a lower end of said vertically movable block for measuring flatness of an upper surface of said anvil; and
  said unnecessary prepreg portion removing means being located at a downstream side of said prepreg tape cutting device for removing said unnecessary prepreg portions from said prepreg tape to form a cut prepreg tape;
  said unnecessary prepreg portion removing means including a swingable arm which is adjustable into a contact position with said unnecessary portions, swing means for swinging said arm, and means for moving said swinging arm in a direction parallel with a plane lying flush on said operating table so as to remove said unnecessary prepreg portions; and a cut prepreg tape take up means which includes a take up reel located on the downstream side of said cutter for taking up said cut prepreg tape.

6. The apparatus according to claim 5, further comprising a chute located between said means for removing said unnecessary portion of said prepreg portion and said take up reel for preventing deflection of said prepreg tape.

7. The apparatus according to claim 1 with said moving means comprising;

linear ways installed on one side of said operating table in parallel therewith;

a column base movable along said linear ways;

a pinion and a rack meshing with said pinion, said pinion and said rack cooperating to move said column base in parallel with said operating table;

an arm supported by said column base to extend across said operating table;

a feed screw contained in said arm and rotated by a driving nut; and a saddle supported by an outer end of said arm to be movable in a vertical direction.

8. The apparatus according to claim 7, wherein said arm comprises a telescoped first arm and a second arm, said first arm being slidably mounted on said column base, and said second arm being slidable in said first arm and supporting said removable head.

9. The apparatus according to claim 1 wherein said pressing means includes a pressure applying mechanism and a lamination roller, which pressure applying mechanism is adjusted to different levels so as to place said lamination roller at different levels in accordance with a required level of lamination.

10. The apparatus according to claim 1 wherein said separating table includes a plurality of pins and means for selectively vertically moving a group of said pins positioned below said laminated prepreg member.

11. The apparatus according to claim 1 further comprising a scraper for separating said prepreg lamination sheet from an underlying release sheet, which is supported by said operating table and upon which lamination of said prepreg segments occur, during transference of said prepreg lamination sheet from said operating table to said separating table.

12. The apparatus according to claim 1 wherein said trimming means form a plurality of laminated prepreg members in said laminated prepreg sheet and said apparatus further comprising marking means for marking said laminated prepreg members with an identification code.

13. Apparatus for manufacturing a laminating member comprising:

prepreg tape cutting means including a prepreg tape cutting device for cutting a prepreg tape to have a predetermined configuration;

removing means for removing unnecessary portions from said prepreg tape;

a pay out reel for continuously paying out a continuous prepreg tape;

prepreg tape take up means for taking up a cut prepreg tape, from which unnecessary portions of said prepreg tape have been removed, together with a backing paper bonded to said cut prepreg tape onto a coil;

prepreg tape exchanging means located adjacent to said prepreg cutting means;

a lamination attachment;

said prepreg tape exchanging means including means for mounting said coil of said prepreg tape onto said lamination attachment;

attachment stocking means positioned close to said prepreg tape exchanging means for storing said lamination attachment and a trimming attachment;

an operating table located adjacent to said attachment stocking means;

an upper surface of said operating table being used to laminate a prepreg sheet, and said operating table also supporting a mold release sheet to be taken up by a take up roller located adjacent to one end of said operating table;

a column slidable along a guide rail extending in parallel with a longitudinal direction of said operating table;

a supporting arm connected to said column for supporting a removable head which includes holding means for holding and swinging said lamination attachment and said trimming attachment, respectively;

transfer means movable along a transfer rail opposite to said guide rail for taking out cut laminated members from said laminated prepreg sheet; and a separating table located on a downstream side of said operating table, a scraper installed between said operating table and said separating table for separating said laminated prepreg sheet from said mold release sheet bonded thereto, and shaping means, which includes a shaping jig and jig exchanging means for exchanging said shaping jig between a shaping jig support and a shaping machine.

14. The apparatus according to claim 13, wherein said prepreg cutting means is constituted by a ultrasonic wave cutter including means for controlling a cutting position determined by a configuration of a prepreg sheet and direction of orientation angle of said prepreg sheet.

15. The apparatus according to claim 13, further comprising a marking device supported by said arm for applying an identification mark onto said laminated prepreg sheet.

16. The apparatus according to claim 13 further comprising a backing paper storage coil which stores backing paper subsequent to removal of said unnecessary prepreg portions and subsequent to lamination of said prepreg segments, and said prepreg tape exchanging means including means for removing said backing paper storage coil from said lamination attachment.

17. The apparatus according to claim 16 wherein said exchanging means supplies said coil with prepreg tape to said lamination attachment simultaneously with the removal of said backing paper storage coil.

* * * * *